US008619303B2

(12) United States Patent
Miura

(10) Patent No.: US 8,619,303 B2
(45) Date of Patent: Dec. 31, 2013

(54) PRINTING APPARATUS WITH PLURALITY OF PRINT CONTROL DEVICES FOR DETECTING, COMMUNICATING, COMBINING AND SYNCHRONIZING PRINTING PROCESS

(75) Inventor: Hirotsuna Miura, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 40 days.

(21) Appl. No.: 13/194,814

(22) Filed: Jul. 29, 2011

(65) Prior Publication Data
US 2012/0026546 A1 Feb. 2, 2012

(30) Foreign Application Priority Data

Jul. 30, 2010 (JP) .................................. 2010-173011

(51) Int. Cl.
*G06K 15/02* (2006.01)
(52) U.S. Cl.
USPC ............................................ 358/1.15; 347/14
(58) Field of Classification Search
USPC ............................................ 358/1.15; 347/14
See application file for complete search history.

(56) References Cited

U.S. PATENT DOCUMENTS

| 7,311,379 B2 | 12/2007 | Mitsuzawa |
| 2004/0046830 A1 | 3/2004 | Mitsuzawa |
| 2007/0075691 A1* | 4/2007 | Burstein et al. ................ 323/272 |

FOREIGN PATENT DOCUMENTS

JP 2004-025551 1/2004

* cited by examiner

*Primary Examiner* — Qian Yang
(74) *Attorney, Agent, or Firm* — Maschoff Brennan

(57) ABSTRACT

Controllers on the master and slave sides each perform an ink cartridge checking process and transmit a detection result, for example "NG", obtained though the ink cartridge checking process to the other controller. Furthermore, the same ink cartridge checking process is performed in the other controller and the detection result thereof, for example "OK" is transmitted to the first controller. A mechanical control unit merges (combines) the respective detection results and if at least one of the results is NG, a merged result of NG is obtained. In the case of NG, this fact is transmitted to a host control unit and if YES is selected in a Y/N display, the error is cleared. On the other hand, in the case of a merged result of OK, an ink cartridge OK state notification is issued to a mechanical controller.

7 Claims, 10 Drawing Sheets

PRINTING APPARATUS WITH PLURALITY OF PRINT CONTROL DEVICES FOR DETECTING, COMMUNICATING, COMBINING AND SYNCHRONIZING PRINTING PROCESS

This application claims the benefit of Japanese Application No. 2010-173011, filed Jul. 30, 2010, all of which are hereby incorporated by reference.

BACKGROUND

1. Technical Field

The present invention relates to a print control device that controls a printing unit in a printing apparatus, to a printing apparatus and to a print control method for a printing apparatus.

2. Related Art

For example, a printing apparatus that is equipped with a plurality of print heads that eject ink is disclosed in JP-A-2004-25551. In this printing apparatus, a plurality of print heads and a plurality of driving control units that control driving of the plurality of print heads are mounted on a carriage provided so as to be capable of reciprocating. Furthermore, a plurality of data processing units that transfer data to the individual driving control units are mounted in the main body of the printing apparatus. A plurality of circuit sets each consisting of one driving control unit and one data processing unit are connected to every predetermined number of print heads in a main control unit that controls reciprocation of the carriage. Since a configuration is adopted in which processing is allocated to one circuit set for every predetermined number of print heads, with this printing apparatus, the processing load on each data processing unit is reduced.

Furthermore, in the case where there are a large number of print heads, a printing apparatus configuration may be adopted in which two or more main control units are provided and a print control device, in which a main control unit, a data processing unit and a driving control unit form a circuit set, is formed on a single substrate. This substrate is then provided in a plurality. By adopting this configuration for a printing apparatus, since a plurality of print control devices are allocated with and control a large number of recording heads, as the number of recording heads increases, the number of print control devices also increases, whereby the load on each print control device remains relatively small and the required printing speed can be ensured.

Furthermore, in the case where a configuration is adopted in which individual print control devices that are in charge of a plurality of recording heads and a driving control device that controls driving of a carriage and transporting of a print medium (sheet) are formed separately and the individual print control devices transmit commands acquired from print data to the driving control device, it is necessary to synchronize the timings at which commands are output from the individual print control devices to the driving control unit. For example, one print control device is made the master (master-side print control device) and another print control device is made the slave (slave-side print control device). Then, a configuration is adopted in which, at a stage when a command to be output by the master-side print control device and a command to be output by the slave-side print control device are both present, the individual print control devices transmit these commands to the driving control device (mechanical controller or the like) of the carriage system and the transport system in synchronization with each other. With such a configuration, it becomes possible to control ink ejection processing for individual recording heads that are individually controlled by the print control devices and transport processing for a printing medium controlled by the driving control device to be at suitable timings.

In addition to a plurality of recording heads being allocated to a plurality of print control devices, it is preferable that components included in the printing apparatus in a plurality, such as a plurality of ink cartridges that supply ink to the recording heads and nozzle testing devices that test for clogging of the nozzles of the recording heads, be allocated to and connected to a plurality of print control devices and that their loads be allocated among the individual print control devices. Here, typically, memory elements, into which ink-related information such as the amounts of ink remaining and ink colors has been written, are provided in the ink cartridges and the individual print control devices are allocated with and manage the ink-related information such as the amount of ink remaining for each ink by accessing the memory elements of the ink cartridges they are in charge of.

Sometimes cases occur where commands (internal commands) are individually generated in only a certain print control device. For example, an error in a component such as a recording head, ink cartridge, nozzle testing device or the like that a print control device is in charge of such as an out of ink error (end of ink error) or a clogged nozzle error for a nozzle testing device in an ink cartridge that a print control device is in charge of, is an example of an internal command generated within the print control device.

However, for example, if an internal command is generated by a master-side print control device, an internal command is not generated by the other slave-side print control device. Consequently, there is a problem in that when one print control device needs to attain synchronization in order to output an internal command, since the command is not present in the other print control device, the internal command cannot be output.

Furthermore, internal commands may include commands for detecting the states of devices or the states of components such as ink cartridges or the like and for making notification of an OK state or an NG state in response to a detection result in order to cause the printing apparatus to perform a predetermined operation such as when initiating the printing apparatus or when an ink cartridge is to be replaced. In this case, upon receiving an OK state command as a notification in the case of an OK state, a driving control device performs control to initiate a predetermined operation unit or on the other hand upon receiving an NG state command in the case of an NG state, the driving control device performs control so as not to initiate the operation unit, and generally if an operation unit has already been initiated the operation unit is stopped.

For example, in the case where there is an OK state in one print control device and an NG state in the other print control device, if the operation unit is stopped, then the driving control device should not initiate the operation unit and if the operation unit has been initiated, then the driving control device should stop the operation unit. If a configuration is adopted in which commands from both sides are separately transmitted to the driving control device, there is a problem in that, when an OK state command has been transmitted, inconvenience is caused such that an operation unit that should not be initiated is initiated. Furthermore, when the timings at which commands are output are synchronized between a plurality of print control devices, there is a problem in that a command transmission error occurs due to a command not being present in all the print control devices.

SUMMARY

An advantage of some aspects of the invention is that a print control device, a printing apparatus and a print control method for the printing apparatus are provided with which the occurrence of transmission of inappropriate commands to a driving control unit and the occurrence of command transmission errors can be avoided even when different state detection results are obtained from a plurality of print control devices.

According to a first aspect of the invention, there is provided a print control device for a printing apparatus equipped with a plurality of print control devices, which are allocated with and control printing units, and a driving control unit that controls driving of mechanical printing mechanisms on the basis of commands from the print control devices, the print control device including: a detecting unit that detects the states of components allocated to the print control device among a plurality of components included in the printing apparatus that are allocated to and connected to the plurality of print control devices; a communication unit for transmitting a detection result of the detection unit to another print control device and receiving a detection result from the other print control device; a combining unit that combines the detection result of the detection unit and the detection result received from the other print control device; a command generating unit that generates a normal state command if the combined result created by the combining unit is normal and that generates an abnormal state command if the combined result created by the combining unit is abnormal; and a synchronizing unit, upon checking that a command to be output is present in the plurality of print control devices, allows the command to be output to the driving control unit.

According to this aspect of the invention, the plurality of print control devices each acquire from the other the respective detection result of the detection unit of the detected states of the components allocated to that print control device. The combining unit of one of the print control devices combines the detection result of the detection unit and the detection result received from the other print control device. The command generating unit generates a normal state command if the combined result created by the combining unit is normal and generates an abnormal state command if the combined result created by the combining unit is abnormal. As a result, since it is checked that commands to be output by the respective print control devices are all present in the synchronization unit, the transmission of inappropriate commands to the driving control unit and the occurrence of command transmission errors in the synchronization unit can be avoided.

In the print control device according to the first aspect of the invention, the detection unit preferably detects a non-optimal component state of a non-optimal component that the printing apparatus can use to perform printing although it is not recommended and in the case where a non-optimal component state is detected, the detection unit obtains an abnormal detection result and in the case where a satisfactory component state is detected, the detection unit obtains a normal detection result, and in the case where the detection result is abnormal, the command generating unit preferably transmits an abnormal state command as a notification to a checking unit that prompts selection of whether to use the non-optimal component as is, and upon receiving a response from the checking unit that the non-optimal component is to be used as is, generates a normal state command.

According to this aspect of the invention, the detection unit detects a non-optimal component state of a non-optimal component that the printing apparatus can use to perform printing although it is not recommended and in the case where a non-optimal component state is detected, the detection unit obtains an abnormal detection result and in the case where a satisfactory component state is detected, the detection unit obtains a normal detection result. The combining unit of each of the print control devices combines the detection result of the detection unit and the detection result received from the other print control device. In the case where the combined result is abnormal, the command generating unit transmits an abnormal state command to the checking unit as a notification, the checking unit prompting selection of whether to use the non-optimal component as is, and upon receiving a response from the checking unit that the non-optimal component is to be used as is, generates a normal state command. On the other hand, in the case where the combined result is normal, the command generating unit generates a normal state command. Therefore, occurrence of a command transmission error in the synchronization unit due to a command not being present in all the print control devices can be avoided and the transmission of inappropriate commands to the driving control unit can be avoided.

In the print control device according the first aspect of the invention, the components are preferably fluid accommodating bodies that accommodate a fluid to be supplied to the printing units and a memory unit is preferably provided in each fluid accommodating body, the memory unit storing reference information that is referred to when detection is performed by the detection unit, and the detection unit preferably detects an abnormality in the fluid accommodating bodies on the basis of the reference information read out from the memory elements.

According to this aspect of the invention, the states of the fluid accommodating bodies, which are allocated to and managed by the plurality of print control devices, are detected. A state command is generated on the basis of a detection result created by combining (merging) the detection results of the individual print control devices. Therefore, even when the state of a fluid accommodating body allocated to and managed by one print control device among the plurality of print control devices is abnormal, inappropriate initiation or stopping of an operation unit by the driving control unit and the occurrence of command transmission errors can be avoided.

In the print control device according the first aspect of the invention, the components may be fluid accommodating bodies that accommodate a fluid to be supplied to the printing units and a memory unit may be provided in each fluid accommodating body, the memory unit storing reference information that is referred to when detection is performed by the detection unit, and the detection unit may detect a non-optimal fluid accommodating body on the basis of the reference information read out from the memory elements.

According to this aspect of the invention, non-optimal states of fluid accommodating bodies, which are allocated to and managed by the plurality of print control devices, are detected. A state command is generated on the basis of a detection result created by combining (merging) the detection results of the individual print control devices. Therefore, even when the state of a fluid accommodating body allocated to and managed by one print control device among the plurality of print control devices is detected as being non-optimal, inappropriate initiation or stopping of an operation unit by the driving control unit and the occurrence of command transmission errors can be avoided.

In the print control device according to the first aspect of the invention, if the individual detection results prior to being combined include even one detection result of detection of a non-optimal component, the combining unit may make the result of combining be an abnormal result, whereas if all satisfactory components are detected, the combining unit may make the result of combining the individual detection results be a normal result. According to this aspect of the invention, the occurrence of command transmission errors and the transmission of inappropriate state commands to the driving control unit can be avoided.

In the print control device according to the first aspect of the invention, a plurality of print heads may be included in the printing units be allocated to and connected to the plurality of print control devices, and the print control device may further include a consumed amount acquiring unit that acquires amounts of fluid consumed by the print heads allocated to the print control device. An amount of fluid consumed by the print heads connected to another print control device from each allocated fluid accommodating body is received from the other print control device through the communication unit and an amount of fluid consumed by the print heads connected to the print control device from each allocated fluid accommodating body is transmitted to the other print control device via the communication unit. The consumed amount acquiring unit may calculate a remaining amount or consumed amount of fluid in each fluid accommodating body allocated to the print control device on the basis of the acquired amount of fluid consumed and the consumed amount of fluid received from the other print control device. The non-optimal state detection result obtained by the detection unit and the amount of fluid consumed may be transmitted and received together between the print device and the other print control device.

According to this aspect of the invention, detection results of non-optimal states of components are transmitted and received together with information on the amounts of fluid consumed between the print control device and another print control device. As a result, compared with the case where information on the amounts of fluid consumed and the detection results are separately transmitted and received, the transmission and reception of information on the amounts of fluid consumed and detection results can be completed more quickly.

According to a second aspect of the invention, a printing apparatus is provided that includes a plurality of print control devices, which are allocated with and control printing units on the basis of print data, and a driving control unit that controls driving of mechanical printing mechanisms on the basis of commands from the print control devices, the print control devices each being the print control device according to the first aspect of the invention. According to this aspect of the invention, the printing apparatus is equipped with the print control device according to the first aspect of the invention and therefore the same advantages can be obtained as with the print control device according to the first aspect of the invention.

According to a third aspect of the invention, there is provided a print control method for a printing apparatus equipped with a plurality of print control devices, which are allocated with and control printing units, and a driving control unit that controls driving of mechanical printing mechanisms on the basis of commands from the plurality of print control devices, the print control method including: detecting the states of a plurality of components included in the printing apparatus that are allocated to and connected to the plurality of print control devices; transmitting a detection result of the detecting to another print control device and receiving a detection result from the other print control device; combining the detection result of the detecting and the detection result from the other print control device; generating a normal state command if a combined result created in the combining is normal and generating an abnormal state command if the combined result created in the combining is abnormal; and synchronizing output of, upon checking that a command to be output is present in the plurality of print control devices, allowing the command to be output to the driving control unit. The same advantages can be obtained with this aspect of the invention as with the print control device according to the first aspect of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
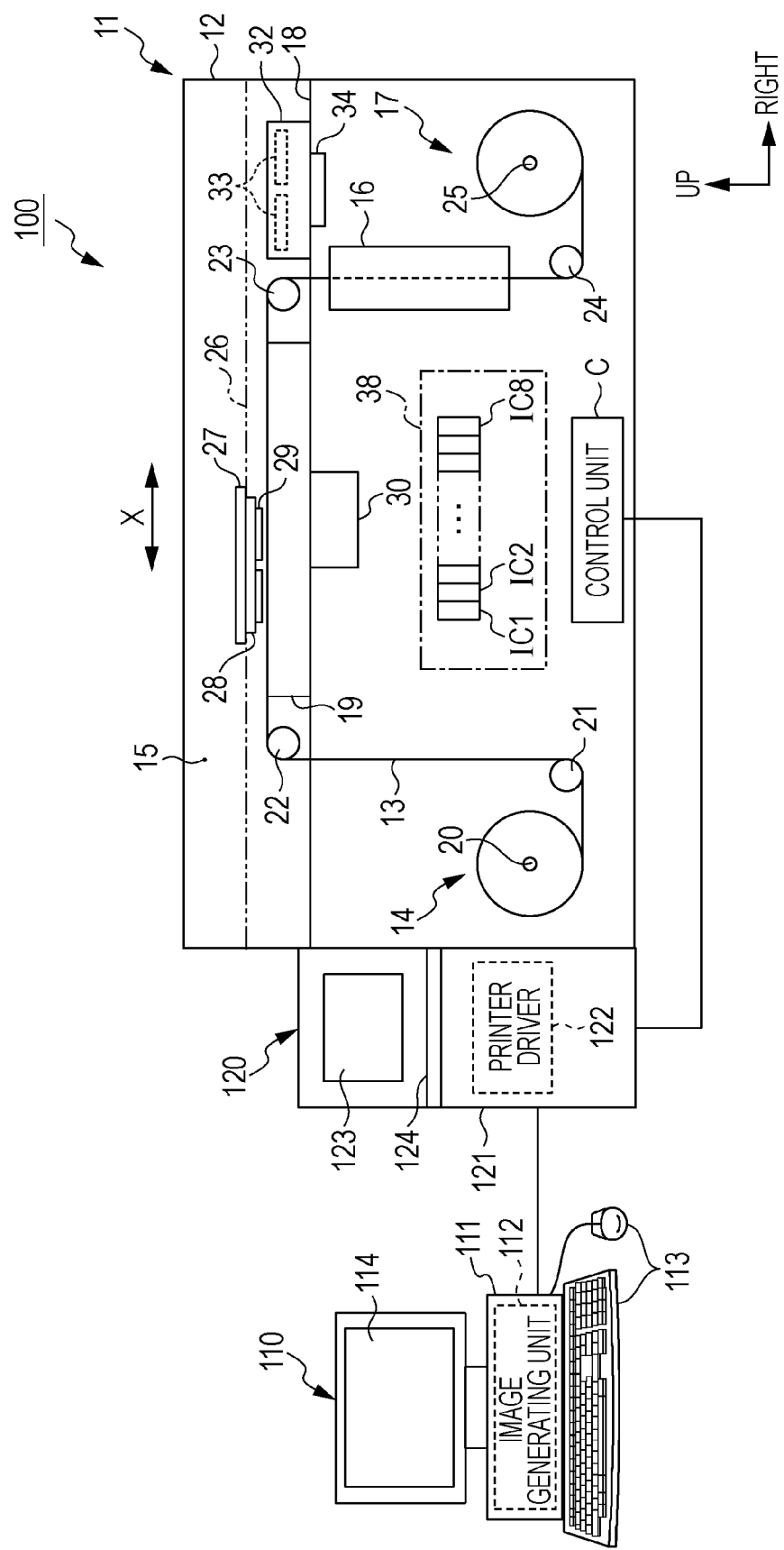
FIG. 1 is a schematic side view of a printing system according to an embodiment.

Hereafter, an embodiment in which the invention is realized as a print control device of a lateral ink jet printer will be described with reference to FIGS. 1 to 10. FIG. 1 is a schematic diagram of a printing system that includes a lateral ink jet printer. As illustrated in FIG. 1, a printing system 100 includes an image-generating apparatus 110 that generates image data, a host apparatus 120 that generates print data on the basis of image data received from the image-generating apparatus 110 and a lateral ink jet printer (hereafter, simply referred to as "printer 11"), as an example of a printing apparatus, that prints an image based on print data received from the host apparatus 120.

The image-generating apparatus 110 is for example formed of a personal computer and includes an image generating unit 112 which is created through a CPU within a main body 111 of the image-generating apparatus 110 executing image creation software. A user initiates the image generating unit 112 and creates an image on a monitor 114 by operating an input device 113 and then instructs printing of the image by operating the input device 113. Then, the image data of the image is transmitted to the host apparatus 120 via a predetermined communication interface.

The host apparatus 120 is for example formed of a personal computer and includes printer driver 122 which is created through a CPU within a main body 121 of the host apparatus 120 executing printer driver software. The printer driver 122 generates print data on the basis of image data received from the image-generating apparatus 110 and transmits the print data to a control unit C provided in the printer 11. The control unit C controls the printer 11 on the basis of print data received from the printer driver 122 and causes the printer 11 to print an image based on the print data. For example, a menu screen for inputting and setting values of control settings in the printer 11 and an image that is to be the target of printing are displayed on a monitor 123.

Next, the configuration of the printer 11 illustrated in FIG. 1 will be described. Hereafter, in descriptions in the specification, the terms "left-right direction" and "up-down direction" indicate the directions illustrated by the arrows in FIG. 1 and the other drawings. Furthermore, the front and back of FIG. 1 are respectively front and back sides.

As illustrated in FIG. 1, the printer 11 includes a rectangular parallelepiped shaped main case 12. In the main case 12, there are provided a feeding unit 14 that feeds out an elongated sheet 13, a printing chamber 15 in which printing is performed by ejecting ink onto the sheet 13, a drying device 16 that performs a drying process on the sheet 13 to which ink has been made to adhere by printing, and a winding unit 17 that winds up the sheet 13 that has been subjected to the drying process.

That is, a plate-shaped base 18, which vertically partitions the inside of the main case 12, is provided at a position somewhat close to the top inside the main case 12 and the region above the base 18 forms the printing chamber 15 in which a rectangular plate-shaped supporting member 19 is supported on top of the base 18. In the region below the base 18, the feeding unit 14 is arranged at a position on the left hand side which is the upstream side in the transport direction of the sheet 13 and the drying unit 16 and the winding unit 17 are arranged at positions on the right hand side, which is the downstream side.

As illustrated in FIG. 1, a winding shaft 20 that extends in the front-back direction is provided so as to rotate freely in the feeding unit 14 and the sheet 13 is supported so as to be able to rotate together therewith in a state of having been wound in advance into a roll around the winding shaft 20. That is, the sheet 13 is fed out from the feeding unit 14 with rotation of the winding shaft 20. In addition, the sheet 13 fed out from the feeding unit 14 is wound around a first roller 21 positioned to the right of the winding shaft 20 and guided upward.

A second roller 22 is provided at a position corresponding to that of the first roller 21 therebelow in the up-down direction to the left of the supporting member 19 so as to be parallel to the first roller 21 therebelow. The sheet 13 whose transport direction has been changed to vertically upward by the first roller 21 is wound around the second roller 22 from below and to the left and thereby has its transport direction changed to the horizontal rightward direction and slides along the upper surface of the supporting member 19.

In addition, a third roller 23 is provided so as to oppose the second roller 22, which is to the left with the supporting member 19 interposed therebetween, and so as to be parallel to the second roller 22. The positions of the second roller 22 and the third roller 23 are adjusted so that the tops of the circumferential surfaces thereof are at the same height as the upper surface of the supporting member 19.

After the sheet 13, whose transport direction has been changed to the horizontal rightward direction by the second roller 22 on the left hand side inside the printing chamber 15, has been transported to the right hand side, which is downstream while sliding along the upper surface of the supporting member 19, the transport direction of the sheet 13 is changed to the vertically downward direction by being wound around the third roller 23 from above and to the right and the sheet 13 is transported toward the drying device 16, which is below the base 18. Then, the sheet 13 having been subjected to a drying process by being passed through the inside of the drying device 16 is again transported in the vertically downward direction and then the sheet 13 is wound around a fourth roller 24, has its transport direction changed to the horizontal rightward direction and is then wound up into a roll as a result of a winding shaft 25 of the winding unit 17 arranged to the right of the fourth roller 24 rotating in accordance with the driving power of a transport motor 61 (refer to FIG. 5).

As illustrated in FIG. 1, a pair of guide rails 26 (illustrated by the two-dot dashed line in FIG. 1), which extend in the left-right direction, are provided in front of and behind the supporting member 19 inside the printing chamber 15. The upper surfaces of the guide rails 26 are higher than the upper surface of the supporting member 19 and a rectangular carriage 27 is supported by upper surfaces of the guide rails 26 in a state of being able to reciprocate in a main scanning direction X illustrated in FIG. 1 (left-right direction in FIG. 1) along the guide rails 26 in accordance with driving of a first carriage motor 62 (refer to FIG. 5). In addition, the carriage 27 is capable of moving in a sub-scanning direction (front-back direction orthogonal to plane of paper of FIG. 1) in accordance with driving of a second carriage motor 63 (refer to FIG. 5). A plurality of recording heads 29 are supported by a support plate 28 beneath the carriage 27.

A fixed region from the left end up to the right end of the supporting member 19 serves as a printing region and the sheet 13 is transported intermittently in units of this printing region. The carriage 27 reciprocates with respect to the sheet 13, which is stationary on the supporting member 19, and ink is ejected from the recording heads 29, whereby printing is performed on the sheet 13.

While printing is being performed, a suction device 30 provided beneath the supporting member 19 is driven and the sheet 13 is sucked onto the upper surface of the supporting member 19 by the suction force due to the negative pressure extending over a multiplicity of suction holes formed in the upper surface of the supporting member 19. Then, once one lot of printing on the sheet 13 is finished, the negative pressure of the suction device 30 is released and the sheet 13 is transported.

Furthermore, inside the printing chamber 15, a maintenance device 32 for performing maintenance on the recording heads 29 at a time when printing is not being performed is provided in a non-printing region, which is to the right of the third roller 23. The maintenance device 32 includes a cap 33 for each recording head 29 and a raising/lowering device 34. Each of the caps 33 is moved between a capping position at which the cap 33 abuts against a nozzle formation surface 35 (refer to FIG. 2) of the recording head 29 and a retraction position that is spaced apart from the nozzle formation surface 35.

Furthermore, as illustrated in FIG. 1, a plurality of ink cartridges IC1 to IC8 (for example eight), which respectively accommodate ink of different colors, are removably installed inside the main case 12. Each of the ink cartridges IC1 to IC8 is connected to the recording heads 29 through ink supply channels 70A and 70B (refer to FIG. 3) and each of the recording heads 29 ejects ink supplied from the ink cartridges IC1 to IC8. Accordingly, with this example printer 11, color printing using eight colors of ink is possible. An openable/closeable cover 38 is provided at a location corresponding to the arrangement positions of the ink cartridges IC1 to IC8 in the main case 12. The cover 38 is opened when replacing the ink cartridges IC1 to IC8.

The eight ink cartridges IC1 to IC8 for example accommodate inks such as black (K), cyan (C), magenta (M) and yellow (Y) inks. In addition, a configuration can be adopted in which a moisturizer cartridge that accommodates a moisturizer is installed. Of course, the types of ink (number of colors) can be appropriately set and a configuration for monochrome printing using just black ink, or a configuration having ink of two colors or any number of colors of three or more instead of eight can also be adopted.

Each of the ink cartridges IC1 to IC8 is electrically connected to the control unit C through a cartridge holder 69 (refer to FIG. 3), remaining amount of ink information for the corresponding colors is written into non-volatile memory elements 47 (refer to FIGS. 3 and 5) mounted in the individual ink cartridges IC1 to IC8. In the memory elements 47, in addition to the remaining amount of ink information, ink-related information (example of reference information) such as item number, ink color and expiration date are stored.

Figure 2:
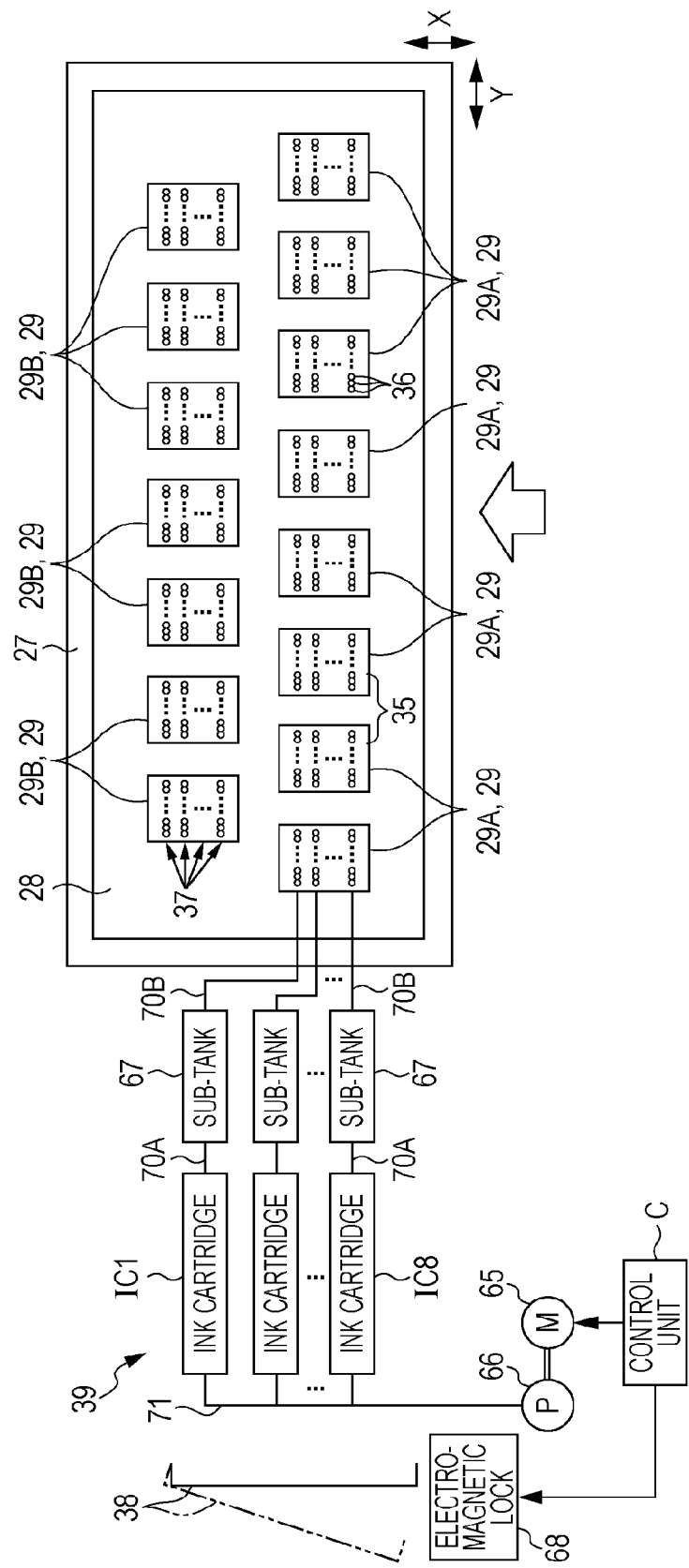
FIG. 2 is a schematic view illustrating the bottom of a recording head and an ink supply device.

FIG. 2 is a schematic diagram illustrating the plurality of recording heads provided on the bottom of the carriage and an ink supply device that supplies ink to the individual recording heads. As illustrated in FIG. 2, the plurality (fifteen in this embodiment) of recording heads 29 are supported by the support plate 28, which is supported underneath the carriage 27, in a staggered arrangement pattern in the widthwise direction (front-back direction), which is orthogonal to the transport direction of the sheet 13 (direction indicated by the unfilled arrow in FIG. 2). That is, among the fifteen recording heads 29, recording heads 29A and 29B arranged in two rows at a uniform pitch along the sub-scanning direction Y form a staggered pattern in which the two rows are shifted from one another by half a pitch in the sub-scanning direction Y. In the nozzle formation surfaces 35 forming the lower surfaces of the recording heads 29, a plurality of nozzle rows 37 (eight in this embodiment), in each of which a multiplicity of nozzles 36 are arranged in a row along the front-back direction (sub-scanning direction Y), are arranged at predetermined intervals in the main scanning direction X.

As illustrated in FIG. 2, an ink supply device 39 is provided that supplies ink of each color to the individual recording heads 29. The ink supply device 39 includes a pump motor 65, a pressurizing pump 66, the ink cartridges IC1 to IC8, sub-tanks 67 and the cartridge holder 69 (refer to FIG. 3).

The individual ink cartridges IC1 to IC8 are mounted in the cartridge holder 69 and connected to the sub-tanks 67 through respective ink supply channels 70A (for example, tubes) and furthermore the sub-tanks 67 are connected to respective recording heads 29 through ink supply channels 70B (for example, tubes). In FIG. 2, only the connection relationship between a plurality of sub-tanks 67 (for example eight) and a single recording head 29 is illustrated. In reality, the same number of ink supply channels 70B as the number of recording heads 29 extend from the eight sub-tanks 67 and the individual ink supply channels 70B are connected to the respective recording heads 29.

Furthermore, the ink cartridges IC1 to IC8, which are mounted in the cartridge holder 69, are connected to a discharge opening of the pressurizing pump 66 through air supply channels 71. As a result of the control unit C driving the pump motor 65, a pump operation of the pressurizing pump 66 is driven and thereby pressurized air discharged from the pressurizing pump 66 is supplied to pressure chambers inside the ink cartridges IC1 to IC8 through the air supply channels 71.

Furthermore, an electromagnetic lock 68, which is for locking the cover 38 into a closed state, is provided in the main case 12 at a position corresponding to an end of rotation of the cover 38 in a closed state as illustrated by the solid line in FIG. 2. For example, an operation switch 72 (refer to FIG. 5), which is for allowing the user to lock and unlock the cover 38, is provided at a position in the vicinity of the cover 38 in the main case 12. When a lock signal is input from the operation switch 72 when an operation is performed to lock the cover 38, the control unit C causes the cover 38 to be locked in closed state by exciting the electromagnetic lock 68. Furthermore, when an unlock signal is input from the operation switch 72 when an operation is performed to unlock the cover 38, the control unit C causes the cover 38 to be unlocked by demagnetizing the electromagnetic lock 68. When a cartridge is to be replaced, as illustrated in FIG. 2, at least one of the ink cartridges IC1 to IC8 is replaced while the cover 38 is in an open state illustrated with a two-dot dashed line (the maximum degree of opening is larger than that shown in FIG. 2), the cover 38 is then put back into a closed state illustrated by the solid line in FIG. 2, and then the cover 38 is locked in the closed state by operating the operation switch 72. The method of instructing locking of the cover 38 is not limited to the method in which the operation switch 72 is operated and a configuration can be adopted in which the control unit C drives excitation of the electromagnetic lock 68 when a closing detection signal is input from a sensor that detects the cover 38 being placed into a closed state.

Figure 3:
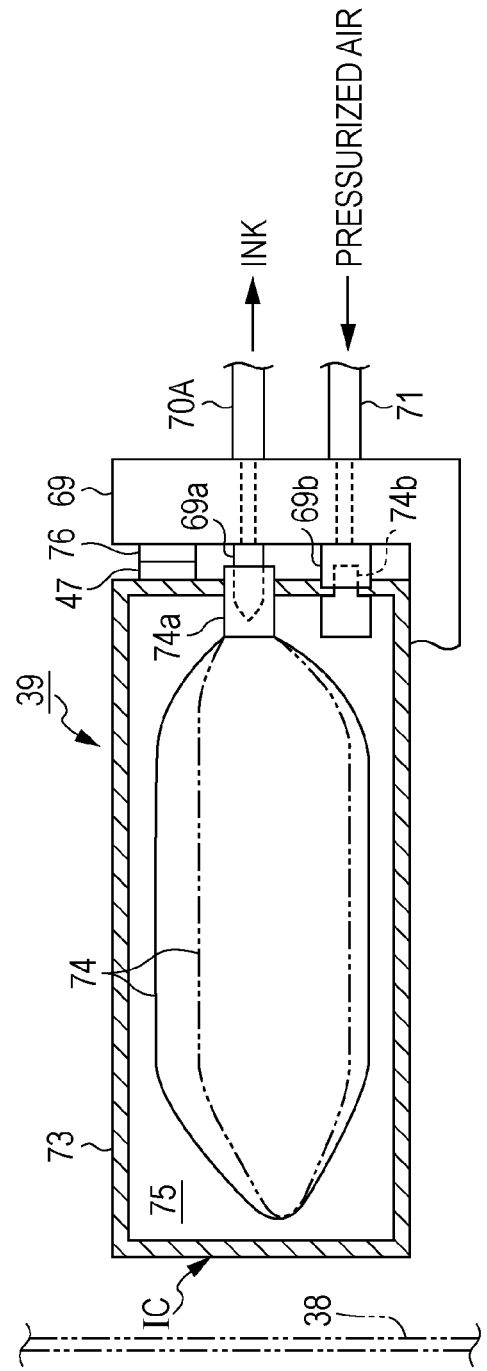
FIG. 3 is a schematic sectional view illustrating essential parts of the ink supply device.

FIG. 3 is a schematic side sectional view illustrating essential parts of an ink supply device. The ink cartridges IC, the ink supply channels 70A and the air supply channels 71 are connected via the cartridge holder 69 illustrated in FIG. 3. In detail, when a supply needle 69a that protrudes from the cartridge holder 69 is inserted into an ink supply portion 74a of an ink pack 74 accommodated in a box-shaped case 73 forming the ink cartridge IC, a valve body (not illustrated in any of the figures) built into the ink supply portion 74a is pushed into the valve opening. As a result, the interior of the ink pack 74 enters a communicative state with the ink supply channel 70A. Furthermore, when an air inlet 74b provided in the ink cartridge IC is inserted into an air supply portion 69b provided in the cartridge holder 69, a valve body (not illustrated in any of the drawings) built into the air supply portion 69b is pushed into the valve opening, whereby a pressure chamber 75 formed between the case 73 and the ink pack 74 enters a communicative state with the air supply channel 71.

As illustrated in FIG. 3, when the ink pack 74 is in a full-of-ink state, as illustrated by the solid line, the volume of the pressure chamber 75 is at a minimum. This minimum volume will be termed an initial volume Ao of the pressure chamber 75 hereafter. As ink is introduced from the ink pack 74 into the ink supply channel 70A, the occupied volume of the ink pack 74 inside the case 73 gradually decreases as illustrated by the two-dot dashed line from the initial state illustrated by the solid line in FIG. 3. Ink corresponding to an amount by which the volume of the ink pack 74 has decreased is supplied to the sub-tank 67 through the ink supply channel 70A and then the ink is supplied from the sub-tank 67 to the corresponding recording head 29 through the ink supply channel 70B. Driving of the pump motor 65 is controlled so that the chamber pressure detected by a pressure sensor (not illustrated), which is capable of detecting the chamber pressure of the pressure chamber 75, falls within a predetermined range. Furthermore, the cartridge holder 69 illustrated in FIG. 3 is provided with terminals 76, which can be electrically connected to the memory element 47 provided on an end surface of the ink cartridge IC in a state of being mounted on the ink cartridge IC.

Figure 4A:
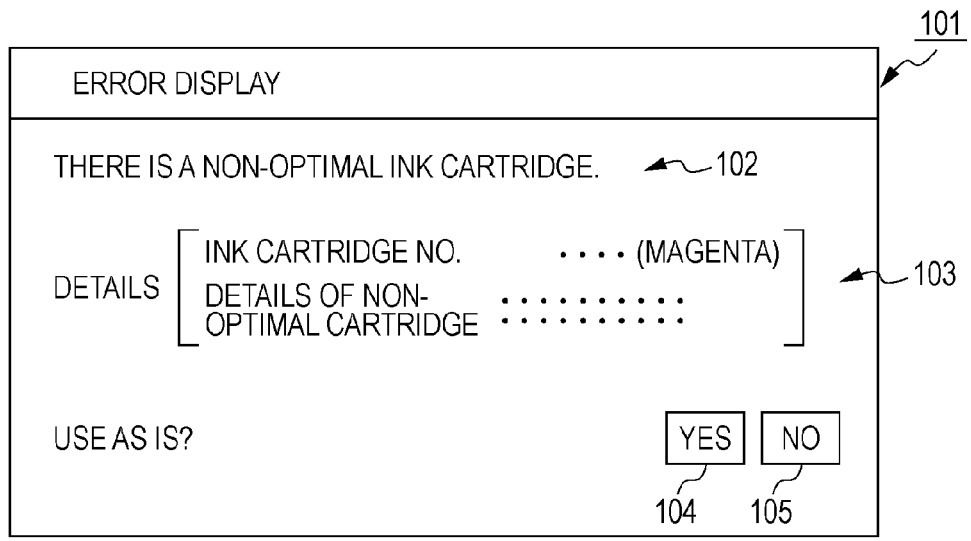
FIGS. 4A and 4B are screen diagrams illustrating error screens.
Figure 4B:
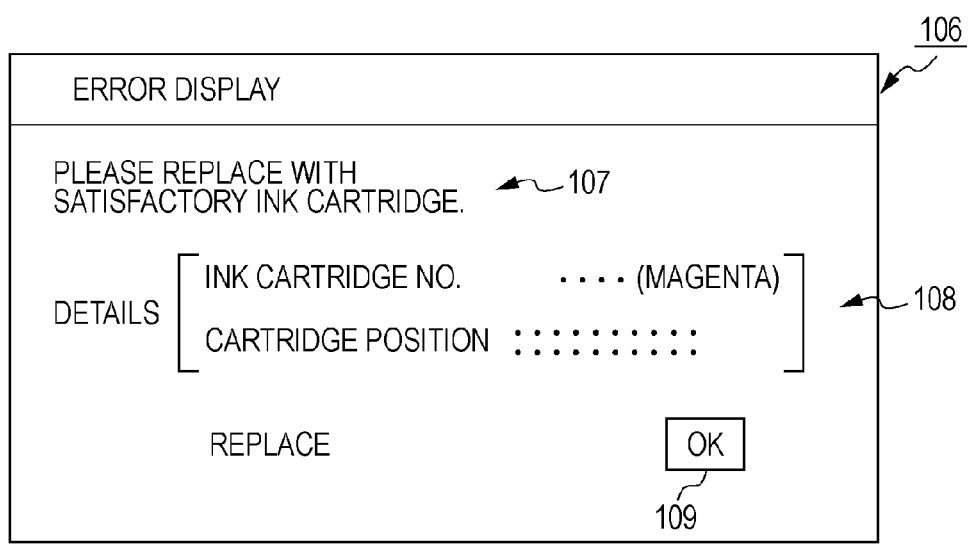
Figure 5:
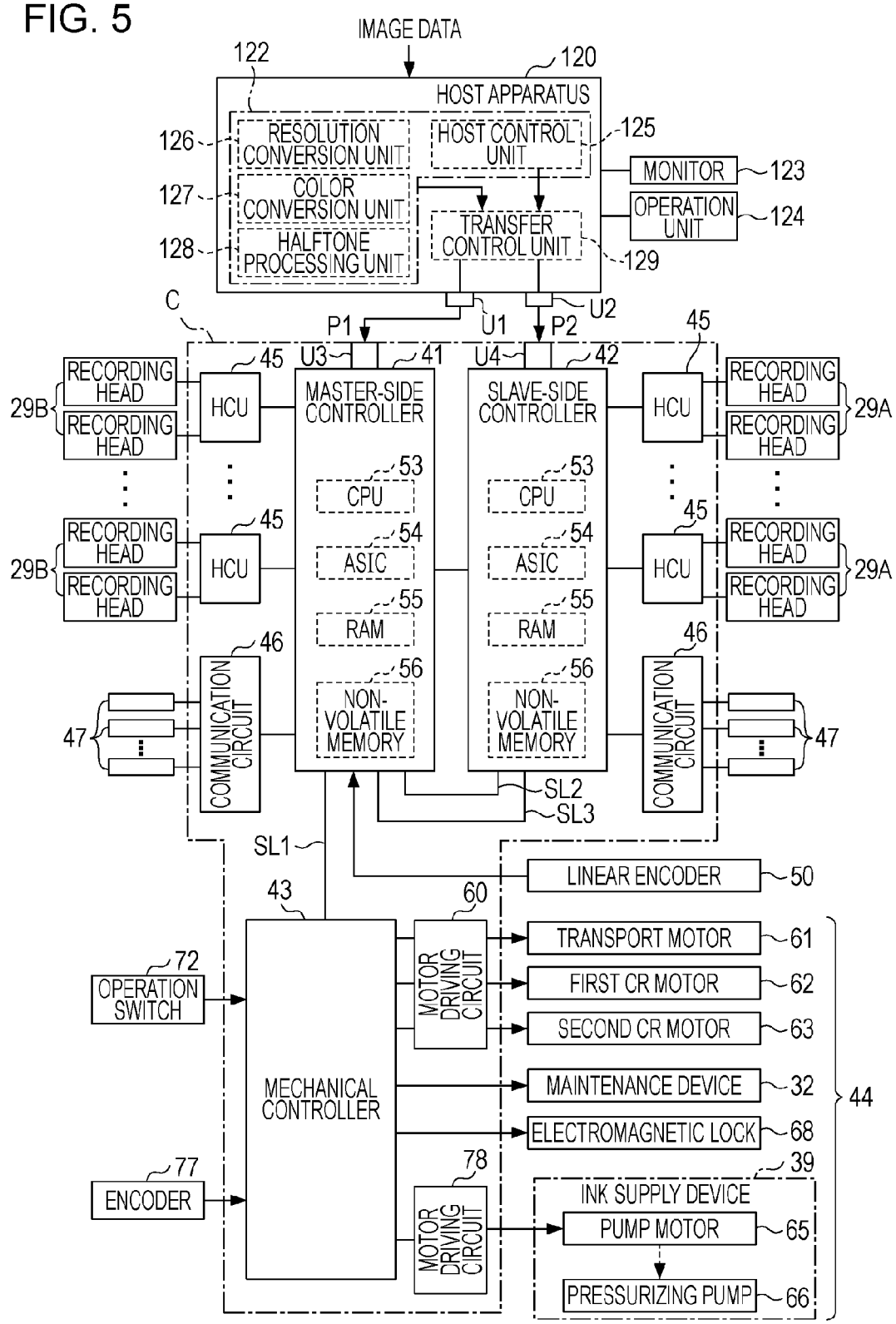
FIG. 5 is a block diagram illustrating the electrical configuration of the printing system.

FIG. 5 is a block diagram illustrating the electrical configuration of the printing system 100. The printer driver 122 within the host apparatus 120 illustrated in FIG. 5 includes a host control unit 125 that controls display of various screens such as a menu screen, a print condition setting screen and an error screen 101 (refer to FIG. 4) to be displayed on the monitor 123 and performs predetermined processing in response to operation signals input from an operation unit 124 for the states displayed on the screens. The host control unit 125 controls the entirety of the printer driver 122. The printer driver 122 further includes a resolution conversion unit 126, a color conversion unit 127 and a half tone processing unit 128, which perform image processing necessary for generating print data for image data ID received from the upper-level image-generating apparatus 110. The resolution conversion unit 126 performs resolution conversion processing to convert the image data ID from the display resolution to the print resolution. The color conversion unit 127 performs color conversion processing to convert colors from the display color space (for example RGB color space or YCbCr color space) to the color space to be used for printing (for example CMYK color space). Furthermore, the half tone processing unit 128 performs for example halftone processing to convert high-gradation (for example 256 gradations) image data for display into low-gradation (for example, two gradations or four gradations) image data for printing. The printer driver 122 generates print job data (hereafter, simply referred to as "print data PD") by attaching a command written in print control code (for example, ESC/P) to the print image data PI generated as a result of the above image processing.

The host apparatus 120 includes a transfer control unit 129 that controls transferring of data. The transfer control unit 129 sequentially serially transfers print data PD generated by the printer driver 122 to the printer 11 in packets of data of a predetermined size.

The control unit C of the printer 11 includes a pair of controllers 41 and 42 that receive print data PD from the host apparatus 120 and perform various control operations including control of a recording system. The plurality of (fifteen in this embodiment) recording heads 29 are divided into two groups of predetermined numbers of recording heads (seven and eight in this embodiment) and are then allocated to and controlled by the pair of controllers 41 and 42. That is, the controller 41 on the master side is in charge of controlling seven recording heads 29B and the controller 42 on the slave side is in charge of controlling eight recording heads 29A.

The printer driver 122 within the host apparatus 120 illustrated in FIG. 5 generates print data P1 and print data P2 by dividing print image data into two pieces in accordance with the arrangement positions of the recording heads 29 that the two controllers 41 and 42 are in charge of and then attaching the same print language description command to the two pieces of print data obtained by the division.

As illustrated in FIG. 5, the host apparatus 120 of this embodiment includes two serial communication ports U1 and U2. Furthermore, the two controllers 41 and 42 also respectively include serial communication ports U3 and U4. The transfer control unit 129 serially transfers the corresponding print data P1 to the master-side controller 41 through communication between the serial communication ports U1 and U3, and serially transfers the corresponding print data P2 to the slave-side controller 42 through communication between the serial communication ports U2 and U4. The host apparatus 120 transfers the print data P1 and the print data P2 comparatively quickly to the controllers 41 and 42 by performing serial transfer using two lines employing the two serial communication ports U1 and U2. In this embodiment, the serial communication ports U2 and U4 through which commands included in the print data P1 and P2 are input form an example of an input unit.

As illustrated in FIG. 5, a plurality (N (in this example four)) of head control units 45 (hereafter, simply "HCUs 45") are connected to the two controllers 41 and 42 and a plurality (M (in this example two)) of recording heads 29 are connected to each HCU 45.

Four, that is, half of the eight memory elements 47 mounted in the eight ink cartridges IC1 to IC8 are connected to the communication circuit 46 connected to the controller 41 and the other four are connected to the other communication circuit 46 connected to the other controller 42. The master-side controller 41 is able to communicate with the memory elements 47 mounted in the four ink cartridges IC1 to IC4 and the slave-side controller 42 is able to communicate with the memory elements 47 mounted in the four ink cartridges IC5 to IC8. The memory elements 47 are formed of non-volatile memory elements (non-volatile memory). A variety of ink-related information, such as the amount of ink remaining, the ink color, expiration date, maintenance information and item number of the corresponding ink cartridge IC, is stored in the memory elements 47. In a state in which the ink cartridges IC (refer to FIGS. 2 and 3) are mounted in the cartridge holder 69, the memory elements 47 and the terminals 76 on the side of the cartridge holder 69 are electrically connected to each other, whereby the communication circuits 46 are connected to the memory elements 47 in a communicative state for performing reading and writing to and from the memory elements 47.

The master-side controller 41 manages the amounts of ink remaining in the four ink cartridges IC1 to IC4 and the slave-side controller 42 manages the amounts of ink remaining in the four remaining ink cartridges IC5 to IC8. The master-side controller 41 is capable of reading and writing ink-related information by communicating with the respective memory elements 47 of the ink cartridges IC1 to IC4 through the corresponding communication circuit 46. Similarly, the slave-side controller 42 is capable of reading and writing ink-related information by communicating with the respective memory elements 47 mounted in the ink cartridges IC5 to IC8 through the corresponding communication circuit 46.

Furthermore, the control unit C includes a mechanical controller 43 that is connected to the output side (downstream side in flow of control) of the master-side controller 41 through a communication line SL1. The mechanical controller 43 governs control of mechanical mechanisms 44 mainly including those of the transport system and the carriage drive system. At a stage at which the master-side controller 41 has been able to prepare the seven recording heads 29B that it is in charge of to be ready for printing (that is, has prepared print image data to be used in control of ink droplet ejection) and at which the slave-side controller 42 has also been able to prepare the eight recording heads 29A that it is in charge of to be ready for printing, the master-side controller 41 transmits a carriage initiation command to the mechanical controller 43. This ensures that ejection misses are prevented from occurring, in which ink droplets are not ejected despite the recording heads 29 having reached the ejection positions due to the carriage 27 being initiated before all of the print preparation operations being performed by the controllers 41 and 42 have finished.

Furthermore, at a stage at which the master-side controller 41 has finished printing using the seven recording heads 29B that it is in charge of and at which the slave-side controller 42 has finished printing using the eight recording heads 29A that it is in charge of, the master-side controller 41 transmits a transport command, which instructs transporting of the sheet 13, to the mechanical controller 43. This ensures that deviation of the impact positions of the ink droplets ejected from the recording heads 29 on the sheet 13 (print position deviation), due to transporting of the sheet 13 being started (or suction of the sheet onto the supporting member 19 being released) at a stage before both of the controllers 41 and 42 has finished printing, is prevented from occurring. Thus, the master-side controller 41 has a function of transmitting commands in synchronization with the progress of the slave-side controller 42. The two controllers 41 and 42 are divided into a slave-side controller that outputs commands to the other controller and a master-side controller that outputs commands to the mechanical controller 43 once it is checked that a command received from the slave-side controller and its own command are both present and that the contents of the commands match. In this embodiment, the mechanism components for attaining synchronization from the viewpoint of control are different on the master side and the slave side.

As illustrated in FIG. 5, a linear encoder 50 is connected to the master-side controller 41. The linear encoder 50 is provided along the movement path of the carriage 27 and a detection signal (encoder pulse signal), which has a number of pulses proportional to the movement distance of the carriage 27, is input to the master controller 41 from the linear encoder 50. The encoder pulse signal input to the master-side controller 41 is transmitted to the slave-side controller 42 through a signal line SL2 connected between the two controllers 41 and 42. Furthermore, the master-side controller 41 and the slave-side controller 42 are connected to each other through a communication line SL3 used for synchronization processing.

As illustrated in FIG. 5, the controllers 41 and 42 each include a CPU (central processing unit) 53, an ASIC (application specific IC (integrated circuit for a specific application)) 54, a RAM 55 and a non-volatile memory 56. The CPU 53 executes various tasks necessary to control printing by executing programs stored in the non-volatile memory 56. Furthermore, the ASIC 54 performs data processing for the recording system such as processing of print data.

On the other hand, the transport motor 61, the first carriage motor (hereafter, "first CR motor 62") and the second carriage motor (hereafter, "second CR motor 63"), which are some of the mechanical mechanisms 44, are each connected to the mechanical controller 43 via a motor driving circuit 60. Furthermore, the maintenance device 32 and the electromagnetic lock 68 are each connected to the mechanical controller 43. Furthermore, the pump motor 65, which constitutes part of the ink supply device 39, is connected to the mechanical controller 43 via a motor driving circuit 78 and the pressurizing pump 66 is driven by the pump motor 65 being driven.

In addition, the above-described operation switch 72 and a transport system encoder 77 are each connected to the mechanical controller 43 as input systems. When a lock operation signal is input from the operation switch 72, the mechanical controller 43 excites the electromagnetic lock 68 and when an unlock signal is input from the operation switch 72, the mechanical controller 43 demagnetizes the electromagnetic lock 68. In accordance with various commands received from the master-side controller 41 via the communication line SL1, the mechanical controller 43 controls driving of the motors 61 to 63 and 65, driving of the maintenance device 32 and driving of the electromagnetic lock 68.

The control unit C, at the time of printing, performs a transport operation by driving the transport motor 61 to transport the sheet 13 until the next region to be printed is positioned on the supporting member 19, a suction operation to cause the next region to be printed to be sucked to the supporting member 19 after transporting the sheet 13, a printing operation of performing printing on the sheet 13 with the recording heads 29 and a suction release operation to release the suction once one lot of printing (one page) has been completed. At this time, the printing operation is carried out by ejecting ink droplets from the recording heads 29 while the carriage 27 is moved in the main scanning direction X. The printing operation is performed by moving the carriage 27 one time (one pass operation) in the main scanning direction X by driving the first CR motor 62 and by moving the carriage 27 in the sub-scanning direction Y by driving the second CR motor 63 after each one pass has finished, and repeating these operations a predetermined number of times.

Figure 6:
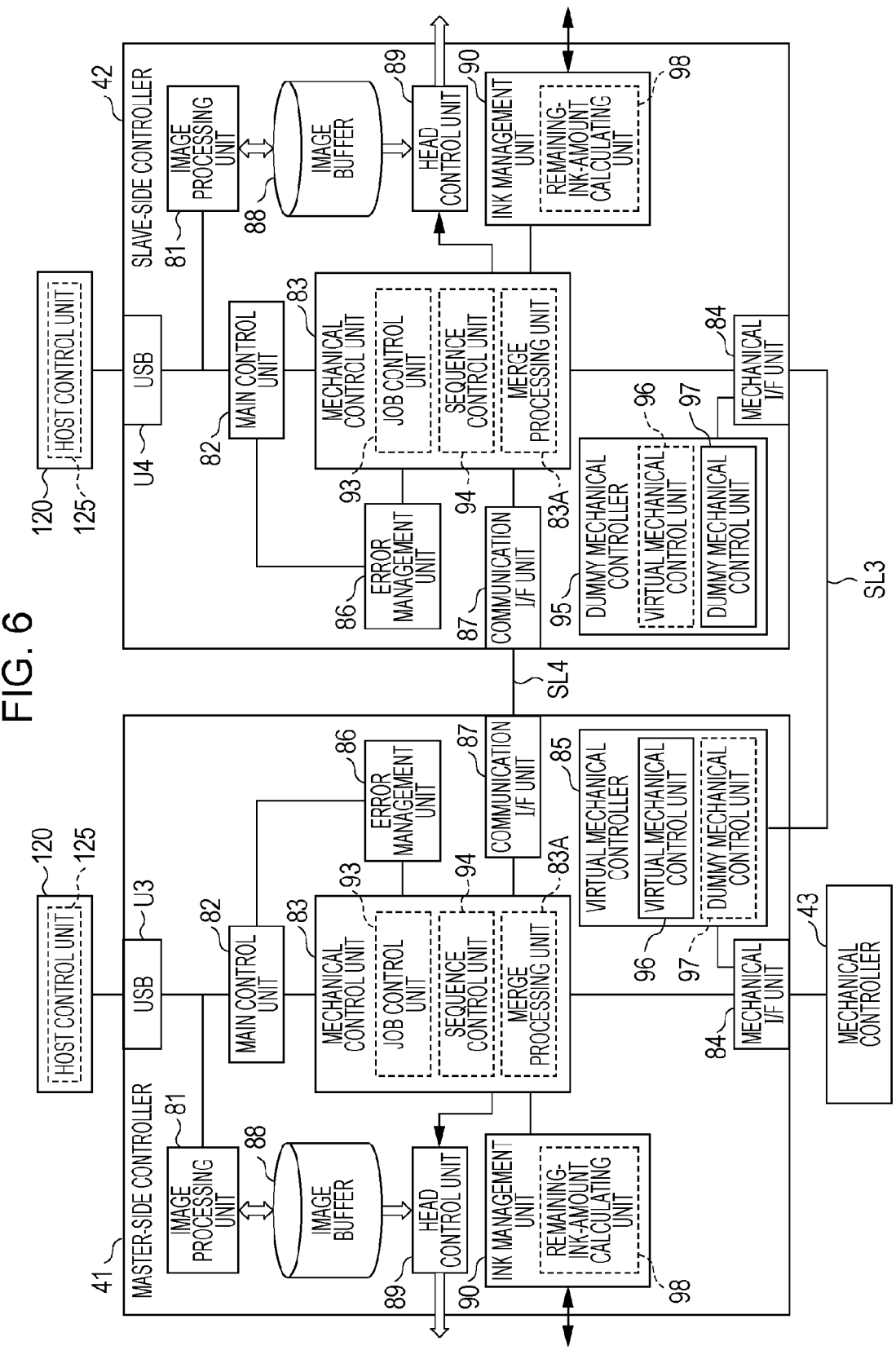
FIG. 6 is an explanatory block diagram of the configurations of a master-side controller and a slave-side controller.

FIG. 6 is a block diagram for explaining the functional configurations of the master-side controller 41 and the slave-side controller 42. As illustrated in FIG. 6, the two controllers 41 and 42 have symmetrical configurations. This is because each of the controllers 41 and 42 on the master and slave sides can be realized using the same program configuration. Since symmetrical configurations are adopted (substantially the same functional configuration), hereafter, the structure of the master-side controller 41 will be described and parts of the functional configuration of the slave-side controller 42 that differ from this will be described.

As illustrated in FIG. 6, the master-side controller 41, includes the serial communication port U3, as an example of an input unit, an image processing unit 81, a main control unit 82, a mechanical control unit 83, a mechanical I/F unit 84, as an example of an output unit, and a virtual mechanical controller 85, as an example of a synchronizing unit. The master-side controller 41 further includes an error management unit 86, a communication I/F unit 87, an image buffer 88, a head control unit 89 and an ink management unit 90, which is an example of a detection unit. On the other hand, the slave-side controller 42 has the same configuration as the master-side controller 41 but includes a dummy mechanical controller 95 instead of the virtual mechanical controller 85. The main control unit 82 has a function of controlling the individual units 83 to 90 in an integrated manner.

Furthermore, the mechanical I/F unit 84 of the slave-side controller 42 is connected to the virtual mechanical controller 85 of the master-side controller 41 through the communication line SL3. That is, in contrast to the mechanical I/F unit 84 of the master-side controller 41 being connected to the actual mechanical controller 43, the mechanical I/F unit 84 of the slave-side controller 42 is connected to the virtual mechanical controller 85 provided inside the master-side controller 41. The mechanical I/F unit 84 on the slave side intends to output commands to the mechanical controller 43 but actually transmits commands to the virtual mechanical controller 85.

The image processing unit 81 of the master-side controller 41 illustrated in FIG. 6 performs image processing such as decompression processing, command analysis, microweave processing and aspect conversion processing on print data P1 input through the serial communication port U3. On the other hand, the image processing unit 81 of the slave-side controller 42 illustrated in FIG. 6 performs image processing such as decompression processing, command analysis, microweave processing and aspect conversion processing on print data P2 input through the serial communication port U4.

The image processing unit 81 temporarily stores decompressed print data in the image buffer 88. Here, the print data P1 includes print image data and print language description commands. The main control unit 82 retrieves control commands by analyzing the print language description commands within the decompressed print data P1 and transmits the retrieved commands to the mechanical control unit 83. The image processing unit 81 sequentially performs necessary image processing such as allocation processing (microweave processing) of allocating dots of print image data to nozzles and aspect conversion processing and generates head control data used in control of the recording heads 29 and stores the head control data in the image buffer 88.

The head control unit 89 reads out head control data from the image buffer 88 and divides the head control data into pieces for the individual recording heads 29 and allocates and transfers the data to the individual HCUs 45. Furthermore, the HCUs 45 sequentially transmit the corresponding head control data to the recording heads 29. A head driving circuit (not illustrated) within each of the recording heads 29 controls driving of ejection driving elements of all the nozzles 36 on the basis of the head control data and causes ink droplets to be ejected from the nozzles 36. At this time, the head control unit 89 generates an ejection timing signal on the basis of an encoder pulse signal input from the linear encoder 50 and the head driving circuit drives the ejection driving elements on the basis of the ejection timing signal.

The mechanical control unit 83 illustrated in FIG. 6 transmits a command received from the main control unit 82 to the mechanical I/F unit 84. At this time, in the case where the received command is a sequence command, the mechanical control unit 83 for example monitors the progress of the processing of the head control unit 89 and at a stage where all head control data to be used in the next pass of printing is present and print preparation has been able to have been performed, the mechanical control unit 83 transmits this sequence command to the mechanical I/F unit 84. Other commands are transmitted to the mechanical I/F unit 84 at suitable times in accordance with the types of commands.

Upon receiving a command from the mechanical control unit 83, the mechanical I/F unit 84 queries the virtual mechanical controller 85. Then, upon receiving an ACK signal (acknowledgment signal) from the virtual mechanical controller 85 as a response to the query, the mechanical I/F unit 84 transmits the command to the mechanical controller 43. That is, if the mechanical I/F unit 84 has not yet received an ACK signal as a response to the query made to the virtual mechanical controller 85, the mechanical I/F unit 84 waits until it receives an ACK signal, and then when an ACK signal is received, transmits the command to the mechanical controller 43. However, in the case where a timeout occurs due to the waiting time waited for a response (ACK signal) reaching a predetermined time period, a retry request is transmitted to the mechanical control unit 83.

The image-processing unit 81, the main control unit 82, the mechanical control unit 83 and the mechanical I/F unit 84 of the slave-side controller 42 perform the same processing. However, the dummy mechanical controller 95 has a different function from that of the virtual mechanical controller 85. When the dummy mechanical controller 95 receives a query from the mechanical I/F unit 84, the dummy mechanical controller 95 unconditionally immediately responds with an ACK signal. Accordingly, when the mechanical I/F unit 84 of the slave-side controller 42 receives a command from the mechanical control unit 83 and queries the dummy mechanical controller 95, the mechanical I/F unit 84 immediately receives an ACK signal from the dummy mechanical controller 95 and therefore outputs the command without waiting for substantially any time from receiving the command.

In contrast, upon receiving a command query from the master-side mechanical I/F unit 84, the master-side virtual mechanical controller 85 responds with an ACK signal to each mechanical I/F unit 84 under the condition that a command that was able to be transmitted from the slave-side mechanical I/F unit 84 through the communication line SL3 and that the two commands (that is, the master-side command and the slave-side command) match each other. Accordingly, the master-side mechanical I/F unit 84 waits for a response when it is determined that commands from both mechanical I/F units 84 on the master and slave sides are present in the virtual mechanical controller 85 and that the present commands match, and when such a response is received, outputs the commands to the mechanical controller 43. Consequently, commands can be transmitted to the mechanical controller 43 in synchronization between the controllers 41 and 42 on the master and slave sides.

As illustrated in FIG. 6, the virtual mechanical controller 85 and the dummy mechanical controller 95 have the same configuration and each include a virtual mechanical control unit 96 and a dummy mechanical control unit 97. When initiated, the virtual mechanical control unit 96 functions as the virtual mechanical controller 85 and when initiated, the dummy mechanical control unit 97 functions as the dummy mechanical controller 95. Which of the virtual mechanical control unit 96 and the dummy mechanical control unit 97 is to be initiated is decided by the main control unit 82 judging whether it is on the master or slave side. In the case where the main control unit 82 judges it is the on the master side, the virtual mechanical control unit 96 is made available and initiated and the dummy mechanical control unit 97 is made unavailable and is not initiated. In the case where the main control unit 82 judges it is the on the slave side, the dummy mechanical control unit 97 is made available and initiated and the virtual mechanical control unit 96 is made unavailable and is not initiated.

Furthermore, upon receiving a command from the mechanical controller 43, the master-side mechanical I/F unit 84 illustrated in FIG. 6 transmits the command to the virtual mechanical controller 85. The virtual mechanical controller 85 transmits the command received from the master-side mechanical I/F unit 84 to the slave-side mechanical I/F unit 84, and then the virtual mechanical controller 85 responds with an ACK signal to the master-side mechanical I/F unit 84. When this response (ACK signal) is received from the virtual mechanical controller 85, the master-side mechanical I/F unit 84 transmits this command to the upper-level mechanical control unit 83. In this embodiment, an input function component that inputs a command from the mechanical controller 43 within the mechanical I/F unit 84 also forms an example of an input unit. In this embodiment, examples of a "first command" include commands input to the serial communication ports U3 and U4 from the host control unit 125 in form of being included in print data, commands generated by the host control unit 125 separately from the print data and input to the serial communication ports U3 and U4, and commands input to the mechanical I/F unit 84 from the mechanical controller 43.

In the case where a command from the master side and a command from the slave side are not both present in the synchronization processing in the virtual mechanical controller 85, since the master-side mechanical I/F unit 84 cannot receive an ACK signal from the virtual mechanical controller 85, timeout occurs when the waiting time reaches the predetermined time. Meanwhile, since mechanical I/F unit 84 of the slave-side controller 42 also cannot receive an ACK signal from the virtual mechanical controller 85, timeout occurs when the waiting time reaches the predetermined time. In this case, the mechanical I/F unit 84 issues a retry request to the mechanical control unit 83. Upon receiving the retry request, the mechanical control unit 83 re-transmits (re-issues) the command to the mechanical I/F unit 84.

The communication I/F units 87 are provided in order to perform communication in order to synchronize processing between the respective head control units 89 on the master and slave sides and in order for the respective ink management units 90 to exchange information (detection results, amounts of ink consumed, etc.) with each other. In this embodiment, each of these communication I/F units 87 is also used to transmit and receive some commands to and from the other controller.

The ink management units 90 illustrated in FIG. 6 each include a remaining-ink-amount calculating unit 98. The remaining-ink-amount calculating unit 98 acquires the amounts of consumed ink for the eight colors of ink consumed by approximately half the recording heads 29B (or 29A). Here, each of the head control units 89 counts for each color the number of dots corresponding to the number of times ink ejection is performed by the recording heads 29B (or 29A) on the basis of the print image data. The ink-remaining-amount calculating unit 98 acquires the number of dots for each color from the head control unit 89 and totals the acquired numbers of dots for the individual colors and calculates the amounts of consumed ink for the individual colors of ink consumed by the recording heads 29B (recording heads 29A on the slave side) on the basis of the totaled numbers of dots of the individual colors. In this way, the remaining-ink-amount calculating unit 98 on the master side calculates the amounts of ink consumed for each color by the seven recording heads 29B and the remaining-ink-amount calculating unit 98 on the slave side calculates the amounts of ink consumed for each color by the eight recording heads 29A.

In this embodiment, the ink cartridges IC1 to IC8 of the plurality of colors are managed by being allocated to the master-side controller 41 and the slave-side controller 42. Thus, a configuration is adopted in which the amounts of consumed ink of the eight colors consumed by the recording heads 29B (recording heads 29A on the slave side) on the side of the corresponding controller calculated by the remaining-ink-amount calculating unit 98 is transmitted to the controller on the other side by communication between the respective communication I/F units 87.

Then, the ink management unit 90 reads out ink-related information including the information on the remaining amounts of ink from the memory elements 47 at the time of initiation of the power supply (of the printer 11 at time of initialization operation) and writes the ink-related information into a predetermined storage region in the RAM. In addition, when a predetermined operation finishes in which ink has been consumed in the printer 11, the ink management unit 90 transmits information on the amounts of ink consumed to the ink management unit 90 on the other side via the mechanical control units 83 and the communication I/F units 87 during a predetermined period such as when the cover 38 is closed (that is, when there is a possibility that a cartridge has been replaced). Then, the remaining-ink-amount calculating unit 98 adds on a color-by-color basis the amounts of consumed ink of the eight individual colors consumed by the recording heads 29A managed by and received from the other side and the amounts of consumed ink of the same eight individual colors consumed by the recording heads 29B that its own side is in charge of, in order to calculate the respective amounts of ink consumed for the eight colors consumed by all of the recording heads 29A and 29B. Furthermore, the remaining-ink-amount calculating unit 98 subtracts the respective amounts of consumed ink of the eight colors from the previous remaining amounts of ink of the eight colors and thereby calculates the current remaining amounts of ink of the eight colors. Thus, the remaining-ink-amount calculating unit 98 obtains information on the current remaining amounts of ink for the ink cartridges IC1 to IC4 managed by its own side and also information on the current remaining amounts of ink for the ink cartridges IC5 to IC8 managed by the other side. Information on the current remaining amounts of ink for all the ink cartridges IC1 to IC8 is temporarily stored in a predetermined storage area in the RAM 55. Then, when a predetermined operation finishes in which ink has been consumed, the ink management unit 90 reads out information on the current remaining amounts of ink from the RAM 55 and writes this information into the non-volatile memory 56 and the memory elements 47 when the power supply is turned off when the power supply switch (not illustrated) is turned off.

The ink management unit 90 performs an ink cartridge checking process (hereafter, also referred to as "IC checking process") in which various detection processes are performed on the ink cartridges IC on the basis of the ink-related information read out from the memory elements 47 of the ink cartridges IC and the predetermined storage region of the RAM 55. A process of detecting a non-optimal cartridge, which will be described below, is also included in the IC checking process.

This IC checking process is performed during a predetermined period such as when the power supply of the printer 11 is turned on and the cover 38 is closed (that is when there is a possibility that a cartridge has been replaced) In particular, in the ink supply device 39 of this embodiment, when the cover 38 has been opened, fluid channels between the ink cartridges IC and the sub-tanks 67 are blocked by closing of the electromagnetic openable/closeable valves, which are not illustrated, and it is possible to open the cover 38 and replace an ink cartridge IC even when a printing operation is in progress. Thus, since it is possible for the remaining amounts of ink to change between before and after opening and closing of the cover 38, it is ensured that calculation of the consumed amounts of ink and calculation of the remaining amounts of ink is performed after the cover 38 has been closed. Calculation of the consumed amounts of ink and calculation of the remaining amounts of ink may also be performed when the power supply of the printer 11 is initiated by the IC checking process (detection process) being performed.

The mechanical controller 43 manages the open/closed state of the cover 38 using a flag on the basis of a detection signal of sensor, which is not illustrated, that can detect the excited/demagnetized state of the electromagnetic lock 68 or the open/closed state of the cover 38 and grasps that the cover 38 has been closed on the basis of a value of this flag. For example, upon detecting that the flag used to manage the open/closed state of the cover 38 has changed from the value of an open state to the value of a closed state and that the cover 38 has been closed, the mechanical controller 43 transmits a cover closed notification (cover closed notification command) to the mechanical control unit 83. The mechanical control unit 83 transmits the received cover closed notification to the ink management unit 90. Upon receiving the cover closed notification, the ink management unit 90 performs the IC checking process. Another reason for the cover closed notification being used as a trigger to initiate the IC checking process is that a configuration is adopted in which writing into the memory elements 47 is permitted when the cover 38 is in a closed state.

When performing the IC checking process, the ink management unit 90 first reads the latest ink-related information by accessing the memory elements 47 or the predetermined region of the RAM. Then, the ink management unit 90 performs the IC checking process by using the read ink-related information and setting information stored in advance in the non-volatile memory 56. Here, the setting information includes for example information indicating a correspondence relationship between a cartridge position number and an ink color, an ink end threshold value (setting value), a near end threshold value (setting value) and determination information used in a process of detecting a non-optimal cartridge.

The ink management unit 90 performs an ink end detection process by for example determining whether or not the amount of remaining ink calculated by the remaining-ink-amount calculating unit 98 is less than the ink end threshold value. In this ink end detection process, in the case where the remaining amount of ink is less than the ink end threshold value, end of ink is detected. Furthermore, in the IC checking process, a mounting failure detection process of detecting failure of mounting an ink cartridge and an incorrect color detection process of detecting mounting of an ink cartridge of an incorrect color are performed.

The ink management unit 90 detects failure of mounting an ink cartridge IC by determining whether or not the memory elements 47 can be accessed through the communication circuit 46. Then, when there is an ink cartridge IC whose memory element 47 cannot be accessed, the ink management unit 90 detects failure of mounting that ink cartridge IC.

The ink management unit 90 reads out ink color information from the memory elements 47 of ink cartridges IC that are connected at mounting positions corresponding to the respective cartridge position numbers set for the mounting positions (ink supply needles) in the cartridge holder. On the basis of this ink color information, the ink management unit 90 performs a process of detecting an incorrect color ink cartridge IC by referring to the information indicating the correspondence relationship between the cartridge position number and ink color and determining whether or not this ink color information matches the ink color corresponding to the cartridge position number. In the case where the ink color information does not match the ink color corresponding to the cartridge position number, the ink management unit 90 detects that there is an ink cartridge of an incorrect color.

Furthermore, the ink management unit 90 performs a non-optimal cartridge detection process (hereafter, also referred to as "non-optimal IC detection process") (detection process) of detecting a non-optimal ink cartridge from among the ink cartridges IC1 to IC8 as one detection item within the IC checking process. That is, the ink management unit 90 performs the non-optimal IC detection process by determining whether the ink cartridges IC that are targets of management are satisfactory ink cartridges (hereafter, also referred to as "satisfactory cartridges") or non-optimal ink cartridges (hereafter, also referred to as "non-optimal cartridges") on the basis of the ink-related information. Here, the term "non-optimal cartridge" refers to an ink cartridge that can be used in printing in the printer 11 but is not optimal (not recommended) to secure print quality. Furthermore, the term "satisfactory cartridge" refers to a satisfactory ink cartridge that is recommended to secure print quality. For example, an ink cartridge IC whose expiration date has passed is a non-optimal cartridge. Since it is possible that ink whose expiration date has passed will have thickened somewhat and this tends to cause clogging of nozzles to easily occur, in the case where high print quality is required, it is preferable that the user replace such an ink cartridge with one whose expiration date has not passed. In this embodiment, ink cartridges with which printing cannot be performed due to for example exhaustion of ink are referred to as "non-usable cartridges" so as to be distinguished from "non-optimal cartridges" with which printing can be performed.

A process of detecting passing of an expiration date in the non-optimal cartridge detection process is performed as follows. If a calculation unit (not illustrated) of the ink management unit 90 compares the "expiration date" acquired from the ink-related information and the current date managed by a real time clock (RTC), which is not shown, and the current date is after the expiration date, then the calculation unit determines that the expiration date has passed. In the case where it is determined that the expiration date has passed, the ink cartridge is detected as an non-optimal ink cartridge.

Furthermore, in the case where a print object has been set for which it is necessary to perform printing using special ink colors such as for logo marks, an ink cartridge having regular ink colors and not the special ink colors would be a non-optimal cartridge. In this case, provided that the area of the reproducible color space is comparatively large, the special colors could be roughly reproduced even when regular inks are used, but is preferable to replace the ink cartridge with an ink cartridge having the special colors in cases when it is necessary to strictly output the special colors.

In the case where special colors have been set for the ink colors, which is one of the pieces of print condition information, the ink management unit 90 reads out ink color information from the memory elements 47 of the ink cartridges IC actually mounted at the mounting positions of cartridge position numbers at which ink cartridges having ink colors of the same hue as the special colors should be mounted. Then, the ink management unit 90 performs a special color detection process by determining whether or not the read colors are the set special colors. In the case where the actual ink colors do not match the set special colors, the ink management unit 90 detects that the ink cartridge is a non-optimal ink cartridge. Since the ink supply device 39 of this embodiment has a function of being able to completely replace ink within the ink supply channels 70A and 70B and the sub-tanks 67, a configuration is adopted in which even when an ink cartridge is replaced with an ink cartridge IC of different colors, mixing of inks from before and after the replacement does not occur.

The ink management unit 90 transmits the results of the IC checking process (detection results) to the mechanical control unit 83. The mechanical control unit 83 transmits the results of the IC checking process (detection results) received from the ink management unit 90 to the mechanical control unit 83 of the controller on the other side through communication via the communication line SL4 between the communication I/F units 87 of the controllers 41 and 42. In this embodiment, a configuration is adopted in which when the IC checking process is performed, basically the previously described ink consumption amount calculation is also performed. Consequently, the mechanical control unit 83 instructs the communication I/F unit 87 to transmit the results of the IC checking process, the amounts of ink consumed and the latest amounts of ink remaining to the mechanical control unit 83 on the other side. Thus, in this embodiment, when exchanging information on the amounts of ink consumed in the recording heads 29 managed on the other side by communication through the communication line SL4, the controllers 41 and 42 transmit the results of the IC checking process (detection results) to the controller on the other side by employing communication between the communication I/F unit 87.

As illustrated in FIG. 6, the mechanical control unit 83 includes a merge processing unit 83A as an example of a combining unit, a job control unit 93 that controls the order in which commands are executed and a sequence control unit 94 that performs sequence control by receiving commands output in an order controlled by the job control unit 93 and controlling the timing at which these commands are then output. The merge processing unit 83A performs merge processing to merge (combine) detection results of the master-side ink management unit 90 and detection results of the slave-side ink management unit 90 received from the slave-side controller 42.

If at least one combination of the detection results of the respective ink management units 90 is abnormal (NG), the merge processing unit 83A produces a merged result of abnormal (NG) and if the detection results of the respective ink management units 90 are all normal (OK), the merge processing unit 83A produces a merged result of normal (OK). The merge processing unit 83A for example manages abnormal (NG) as "0" and manages normal as "1" and performs merge processing by performing AND operations on the respective detection results of the ink management units 90 on the master and slave sides. The merge processing unit 83A performs merge processing for each detection item such as exhaustion of ink, failure of mounting of an ink cartridge, mounting of an ink cartridge of the wrong color, passing of the expiration date or mounting of an ink cartridge of a color different to a necessary special color in the IC checking process.

A non-optimal cartridge is an ink cartridge with which printing can be performed, but is not recommended from the viewpoint of print quality. Accordingly, in this embodiment, a configuration is adopted in which in the case where a non-optimal cartridge has been detected, the user is prompted to choose whether to use the non-optimal cartridge as is or to replace the non-optimal cartridge with a satisfactory cartridge. In the case where, as a merge processing result, a detection result (merged result) that indicates that a non-optimal cartridge has been detected is obtained, the respective mechanical control units 83 of the controllers 41 and 42 notify the host control unit 125 of the host apparatus 120 of the non-optimal cartridge (non-optimal cartridge error). If the host control unit 125 illustrated in FIG. 6 receives a notification of a non-optimal cartridge error from the controllers 41 and 42, the host control unit 125 causes an error screen 101 (refer to FIG. 4A) to be displayed on the monitor 123 (refer to FIG. 5) prompting the user to choose whether to use the non-optimal cartridge as is or not to use the non-optimal cartridge. In this embodiment, the host control unit 125 that checks the user's intention by displaying the error screen 101 and prompts the user to make a selection, forms an example of a checking unit.

FIG. 4A illustrates an error screen displayed when a non-optimal cartridge is detected. The error screen 101 illustrated in FIG. 4A is a screen displayed on the monitor 123 by the host apparatus 120 (specifically the host control unit 125) when the controller 41 or 42 detects a non-optimal cartridge. A report 102 stating "There is a non-optimal cartridge", detailed information 103 regarding the non-optimal cartridge, a YES button 104 and a NO button 105 allowing the user to choose whether or not to use the non-optimal cartridge as is are provided on the error screen 101.

The non-optimal cartridge is used as is when the YES button 104 in the error screen 101 of FIG. 4A is selected, whereas when the NO button 105 is selected the error screen 101 is replaced with an error screen 106 illustrated in FIG. 4B prompting replacement of the ink cartridge. Guidance 107 stating "Please replace with satisfactory ink cartridge", detailed information 108 regarding the ink cartridge to be replaced and an OK button 109 for confirming completion of the replacement are provided in the error screen 106.

After the error screen 101 has been displayed on the monitor 123, the user operates the YES button 104 when the non-optimal cartridge to be used as is. On the other hand, when the non-optimal cartridge is not to be used and the cartridge is to be replaced, the user operates the NO button 105, then opens the cover 38 and replaces the ink cartridge with a satisfactory ink cartridge, and then operates the OK button 109 on the error screen 106 illustrated in FIG. 4B to confirm completion of the replacement. The user noticing display of the error screen 101, operating the operation unit 124 and selecting the YES button 104 or the NO button 105 typically takes from several seconds to several tens of seconds.

In the case where a configuration is adopted in which when only one of the two controllers detects a non-optimal cartridge, the controller on the side that has not detected a non-optimal cartridge generates and transmits an OK state command to the mechanical controller, the following command transmission error arises due to a synchronization error. That is, when another command does not reach the virtual mechanical controller in the controller on the side where a non-optimal cartridge has not been connected and a retry process is repeatedly performed, before long a set time elapses, a timeout occurs and a command transmission error is generated. Furthermore, supposing that, when a non-usable cartridge such as one that is out of ink is detected by only one of the two controllers, the controller on the side on which a non-usable cartridge has not been detected attempts to output an OK state command to the mechanical controller, and on the other hand the controller on the side on which the non-usable cartridge has been detected attempts to output an NG state command to the mechanical controller. In this case, a situation occurs in which matching commands from both sides are not present in the synchronization processing in the virtual mechanical controller and a command transmission error is generated.

In contrast to this, in this embodiment, the respective mechanical control units 83 of the controllers 41 and 42 employ the result of merge processing in which the merge processing unit 83A combines (merges) detection results from both the master and slave sides and therefore the result of the merge processing comes to be the same in both of the controllers 41 and 42. Accordingly, when only one of the controllers 41 and 42 detects a non-optimal cartridge, the processing performed in both the controllers 41 and 42 is the same. Consequently, a situation in which the above-described retry operation is repeatedly performed in the virtual mechanical controller 85 and a timeout occurs as a result can be avoided.

Furthermore, in this embodiment, when only one of the two controllers 41 and 42 detects a non-usable cartridge such as one that is out of ink, as a result of the merge processing, both the controllers 41 and 42 try to output the same state command to the mechanical controller 43. Thus, it comes to be that matching commands from both sides are present in the synchronization processing in the virtual mechanical controller 85 and generation of this type of command transmission error can be avoided.

The mechanical control unit 83 generates an ink cartridge state notification command (hereafter, "IC state notification command") on the basis of the detection result after merge processing performed by the merge processing unit 83A. Such an IC state notification command may be an IC OK state command (normal state command) when the detection result after the merge processing is "OK" or an IC NG state command (abnormal state command) when the detection result after the merge processing is "NG". The mechanical control unit 83 generates an IC OK state command in the case where the result of the merge processing is normal (OK) and on the other hand generates an IC NG state command in the case where the result of the merge processing is abnormal (NG).

If the results of the merge processing are normal for all of the detection targets in the non-usable cartridge detection processing such as there being a cartridge that is out of ink, for which there is a mounting failure or which is of the wrong color, the mechanical control unit 83 generates an IC OK state command and transmits the command to the mechanical I/F unit 84. Furthermore, if a result of the merge processing is abnormal for at least one of the detection targets of the non-usable cartridge detection processing such as there being a cartridge that is out of ink, for which there is a mounting failure or which is of the wrong color, the mechanical control unit 83 generates an IC NG state command and transmits the command to the mechanical I/F unit 84. Furthermore, in the case where the result of the merge processing is abnormal for at least one of the detection targets in the optimal cartridge detection processing, the mechanical control unit 83 generates a non-optimal cartridge error command (hereafter, "non-optimal IC state command") and transmits this command to the host control unit 125 through the error management unit 86 and the main control unit 82.

When the mechanical control unit 83 has transmitted a non-optimal IC state command to the host control unit 125, the mechanical control unit 83 waits until it receives an error clearance notification, which is a response to the non-optimal IC state command, from the host control unit 125. In this case, since the merged results in the mechanical control units 83 on the master and slave sides are the same, when the non-optimal IC error command is transmitted to the host control unit 125 as a notification, the mechanical control units 83 on the master and slave sides both wait until they receive an error clearance notification.

The host control unit 125 in this embodiment is configured to periodically or non-periodically transmit a device state acquisition request to the controllers 41 and 42. Upon receiving a device state acquisition request from the host device unit 125, the respective main control units 82 of the controllers 41 and 42 transmit device information, which is periodically or non-periodically acquired from the mechanical controller 43 and accumulated, to the host control unit 125 as a response to the request. Then, when transmitting device information to the host control unit 125, the main control units 82 both transmit a non-optimal IC error command.

Next, the flows of processing performed in the controllers 41 and 42 of the printer 11 will be described using FIGS. 7 to 10. The main processing includes a process in which commands are output to the mechanical controller 43 in synchronization between the controllers 41 and 42 having received print data (command output processing) and an IC checking process which is performed at a predetermined time such as when the printer 11 is initiated or when an ink cartridge is being replaced (detection processing).

Figure 7:
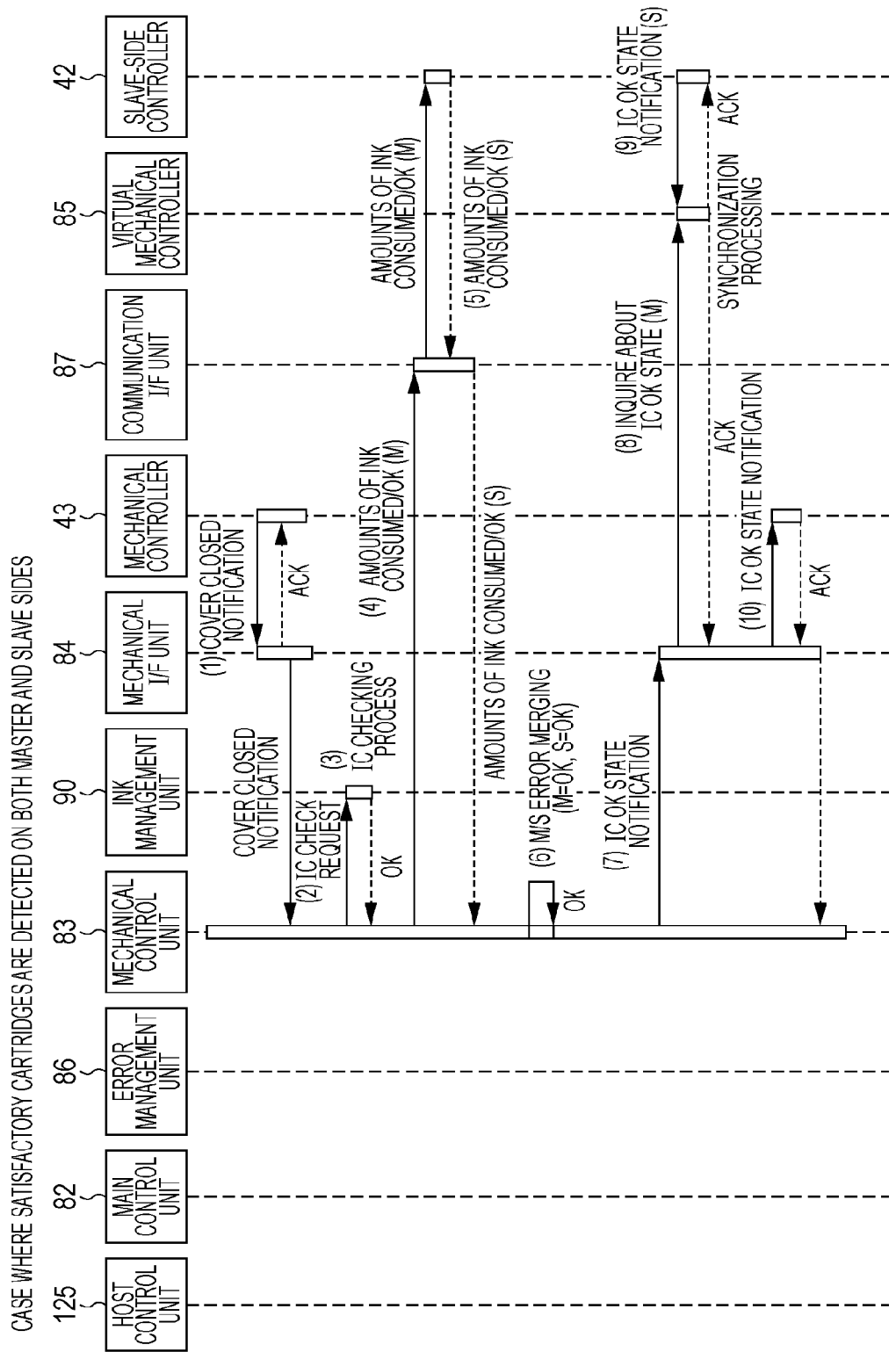
FIG. 7 is a sequence diagram illustrating processing performed in the case where ink cartridges are satisfactory.

First, processing performed in the case where both the master and slave sides detect satisfactory cartridges (that is, a case where no non-optimal cartridges are detected) will be described using FIG. 7. FIG. 7 is a sequence diagram illustrating the flow of this processing. The contents of the processing performed by the master-side controller 41 and the content of the processing performed by the slave-side controller 42 are substantially the same and therefore just the content of the processing performed in the master-side controller 41 is illustrated in the sequence diagrams of FIGS. 7 to 10.

When the user operates the operation switch 72 after closing the cover 38, the mechanical controller 43 drives excitation of the electromagnetic lock 68 and locks the cover 38. As illustrated in FIG. 7, after electromagnetic locking of the cover 38, the mechanical controller 43 transmits a cover closed notification to the master-side controller 41 ((1) in FIG. 7). The cover closed notification is also transmitted to the slave-side controller 42 from the master-side controller 41 via the communication line SL3. Therefore, the mechanical I/F unit 84 receives the cover closed notification in both the controllers 41 and 42 and therefore the same processing is then performed.

As illustrated in FIG. 7, in the master-side controller 41, the mechanical I/F unit 84, which has received the cover closed notification, responds with an ACK signal to the mechanical controller 43 and transmits the cover closed notification to the mechanical control unit 83.

The mechanical I/F unit 84 of the master-side controller 41 receives the cover closed notification. The mechanical I/F unit 84 on the master side transmits the cover closed notification to the mechanical I/F unit 84 on the slave side via the virtual mechanical controller 85. That is, the virtual mechanical controller 85 transmits the cover closed notification received from the master-side mechanical I/F unit 84 to the slave-side mechanical I/F unit 84 and then responds with an ACK signal to the master-side mechanical I/F unit 84. Upon receiving this response, the master-side mechanical I/F unit 84 transmits the cover closed notification to the mechanical control unit 83. The mechanical I/F unit 84 on the slave side, which has similarly received the cover closed notification, transmits the notification to the dummy mechanical controller 95 and upon having received a response of an ACK signal from the dummy mechanical controller 95, transmits the cover closed notification to the mechanical control unit 83. In this way, both the mechanical control unit 83 of the master-side controller 41 and the mechanical control unit 83 of the slave-side controller 42 receive the cover closed notification.

The mechanical control unit 83, which has received the cover closed notification, transmits an ink cartridge check request (hereafter "IC check request") to the ink management unit 90 ((2) in FIG. 7). The ink management unit 90, which has received the IC check request, performs an IC checking process. That is, the ink management unit 90 acquires ink-related information by accessing the respective memory elements 47 of the master-side ink cartridges IC1 to IC4 and checks the states of the ink cartridges IC1 to IC4 on the basis of the ink-related information.

When the respective memory elements 47 of the ink cartridges IC1 to IC4 cannot be accessed (cannot be communicated with) and the states of the ink cartridges IC1 to IC4 cannot be detected, the ink management unit 90 determines that a mounting failure error has occurred such as that one or all of the ink cartridges IC1 to IC4 has not yet been mounted or has been incorrectly mounted in the cartridge holder 69. Furthermore, in the case where states of the ink cartridges IC1 to IC4 can be detected, the ink management unit 90 checks the ink colors on the basis of the ink-related information acquired from the memory elements 47 and if it is determined that the ink color of an ink cartridge does not match the ink color that should be mounted at the corresponding mounting position in the cartridge holder 69, it is determined that a wrong color error (mounting position error) has occurred for one or more of the ink cartridges IC1 to IC4. In this way, the ink management unit 90 detects non-usable cartridges such as ones for which a mounting failure has occurred or ones that are of the wrong color (mounted at the wrong position) among the ink cartridges IC1 to IC4.

Furthermore, the ink management unit 90 compares the expiration dates acquired from the ink-related information and the current date and if an expiration date has already passed, it is determined that there is a non-optimal cartridge. Furthermore, when a special color has been set as an ink color such as a special color to be used when printing a logo mark, the ink management unit 90 compares the ink colors acquired from the ink-related information and the set special color and if none of the ink colors match the set special color, it is determined that there is a non-optimal cartridge. In this way, the ink management unit 90 detects the presence of a "non-optimal cartridge" for which, although the cartridge can be used as is in printing with ink whose expiration date has passed or with ink of a non-optimal color, it is recommended to replace the cartridge with a satisfactory cartridge from the viewpoint of print quality.

FIG. 7 illustrates an example of a case in which satisfactory cartridges are detected on both the master and slave sides and therefore, as results of the IC checking process, all the ink cartridges IC1 to IC4 on the master side are detected as being satisfactory cartridges and no cartridge errors and no non-optimal cartridges are detected. In this embodiment, in the case where all the cartridges are detected as being satisfactory cartridges the result of the IC checking process is "OK", whereas in the case where even one cartridge error or non-optimal cartridge is detected, the result of the IC checking process is "NG". The ink management unit 90 manages these checking results by using for example a one bit flag and manages "OK" as "1" and "NG" as "0". Furthermore, the ink management unit 90 manages the types of checking results for each of the ink cartridges IC1 to IC4 by using for example a parameter of a predetermined number of bits and manages the detailed content of a non-optimal cartridge or a cartridge error by using this parameter. By using this parameter, in the case of "NG", whether there is a non-optimal cartridge or a cartridge error and in addition whether the detailed content thereof corresponds to a non-optimal cartridge or a non-usable cartridge can be identified.

In the example illustrated in FIG. 7, the result of the IC checking process is "OK" ((3) in FIG. 7). At this time, the ink management unit 90 notifies the mechanical control unit 83 of the IC checking process result of "OK". The remaining-ink-amount calculating unit 98 of the ink management unit 90 calculates the amounts of consumed ink of the individual colors on the basis of the discrete numbers of dots ejected by the seven recording heads 29B. That is, a consumption amount is calculated for each type of ink (each color of ink) consumed in the recording heads 29B among ink consumption amounts consumed by the ink cartridges IC1 to IC8 from the remaining amounts of ink calculated the previous time.

The mechanical control unit 83 transmits the amounts of ink consumed by the recording heads 29B of the slave-side ink cartridges IC5 to IC8, the amounts of ink remaining in the master-side ink cartridges IC1 to IC4 and an IC checking process result of "OK" for the master-side ink cartridges IC1 to IC4 to the slave-side controller 42 via the communication I/F unit 87 ((4) in FIG. 7).

On the other hand, the master-side mechanical control unit 83 receives via the communication I/F unit 87 amounts of ink consumed by the recording heads 29A, the amounts of ink remaining in the slave-side ink cartridges IC5 to IC8 and an IC checking process result (detection result) of "OK" for the slave-side ink cartridges IC5 to IC8 via the communication I/F unit 87 transmitted to the master-side communication I/F unit 87 from the slave-side controller 42 performing the same processing as the master-side controller 41 ((5) in FIG. 7).

The mechanical control unit 83 instructs the ink management unit 90 to subtract the amounts of ink consumed by the recording heads 29A of the master-side ink cartridges IC1 to IC4 from the amounts of ink remaining in the ink cartridges IC1 to IC4 and thereby calculate the current (latest) amounts of ink remaining in the ink cartridges IC1 to IC4. Furthermore, the mechanical control unit 83 instructs the ink management unit 90 to subtract the amounts of ink consumed by the recording heads 29B of the slave-side ink cartridges IC5 to IC8 from the amounts of ink remaining in the ink cartridges IC5 to IC8 and thereby calculate the current (latest) amounts of ink remaining in the ink cartridges IC5 to IC8. The flow of processing related to a remaining amounts of ink calculation request and a response of remaining amounts of ink calculation results performed between the mechanical control unit 83 and the ink management unit 90 has been omitted from FIGS. 7 to 10.

The mechanical control unit 83 checks the amounts of ink remaining in the ink cartridges IC1 to IC8 and if there is an amount of ink that is less than a predetermined amount corresponding to the end of the ink, that is, a remaining amount of ink set in advance, the corresponding ink cartridge IC is determined to be at the end of the ink (out of ink). The mechanical control unit 83 detects an ink cartridge that is at the end of the ink as an ink cartridge that is abnormal. The case of an abnormal ink cartridge is denoted as "NG" and the detailed content thereof of "end of ink" is managed using the parameter. The detection of an abnormal state such as the end of ink and the processing for calculating the remaining amounts of ink to realize such detection may be performed by the mechanical control unit 83.

In addition, the mechanical control unit 83 performs error merging processing in which a non-optimal cartridge detection result for the ink cartridges IC1 to IC4 on the master side (hereafter "non-optimal IC detection result") and a non-optimal IC detection result for the ink cartridges IC5 to IC8 on the slave side are merged (combined) ((6) in FIG. 7). That is, the mechanical control unit 83 merges the non-optimal cartridge detection result for the four ink cartridges IC1 to IC4 managed on the master side and the non-optimal cartridge detection result for the four ink cartridges IC5 to IC8 managed on the slave side received from the slave-side controller 42. FIG. 7 illustrates an example of a case in which satisfactory cartridges are detected on both the master and slave sides and therefore the mechanical control unit 83 merges a non-optimal IC detection result of "OK" from the master side and a non-optimal IC detection result of "OK" from the slave side. For example, "OK" is managed as "1" and "NG" is managed as "0" and the mechanical control unit 83 performs a logical AND operation on both the non-optimal IC detection results, and in this case a logical AND operation of "1" for the master side and "0" for the slave side is performed and "1" (OK) is obtained as a merged result.

When the mechanical control unit 83 obtains a merged result of "OK", the mechanical control unit 83 issues an ink cartridge OK state notification (hereafter, "IC OK state notification") to the mechanical I/F unit 84 ((7) in FIG. 7). Upon receiving the IC OK state notification, the mechanical I/F unit 84 queries the virtual mechanical controller 85 regarding the ink cartridge OK state command ((8) in FIG. 7).

Meanwhile, the mechanical control unit 83 on the slave side performs merge processing and since satisfactory cartridges are detected on both the master and slave sides, a merged result of "OK" is also obtained on the slave side as a result of performing a logical AND operation on the non-optimal IC detection results from both sides. Consequently, the slave-side mechanical control unit 83 issues an IC OK state notification to the mechanical I/F unit 84, and the mechanical I/F unit 84 makes a command query to the dummy mechanical controller 95 and upon receiving a response thereto outputs the IC OK state notification. As a result, the virtual mechanical controller 85 receives the IC OK state notification from the slave-side controller 42 ((9) in FIG. 7).

When the virtual mechanical controller 85 has received the commands from both the master and slave sides, since the commands match and are both an "IC OK state command", the virtual mechanical controller 85 responds with an ACK signal to both the mechanical I/F units 84 on the master and slave sides. Each of the mechanical I/F units 84, which have received the response, issues an IC OK state notification to the mechanical controller 43. Then, once the mechanical I/F unit 84 has received a response in the form of an ACK signal from the mechanical controller 43, the mechanical I/F unit 84 notifies the mechanical control unit 83 of this fact.

Upon receiving an IC OK state notification, the mechanical controller 43 drives the pressurizing pump 66 by driving the pump motor 65. As a result, pressurized air is supplied to the individual ink cartridges IC1 to IC8 and ink supplied under pressure from the ink cartridges IC1 to IC8 is supplied to the recording heads 29 through the respective sub-tanks 67. In this way, when there are no errors in the ink cartridges IC1 to IC8, ink supply is performed by the ink supply device 39. In cases where supply of ink by the ink supply device 39 is already in progress, such as when the cover 38 has been opened and closed during a printing operation, the supply of ink is continued. Furthermore, also in cases where the ink supply device 39 has been initiated, the pump motor 65 is driven, not because it is usually driven at such at time, but rather so that the air pressure in the ink cartridges remains within a predetermined pressure range on the basis of the detection result of a pressure detector, which is not illustrated.

Figure 8:
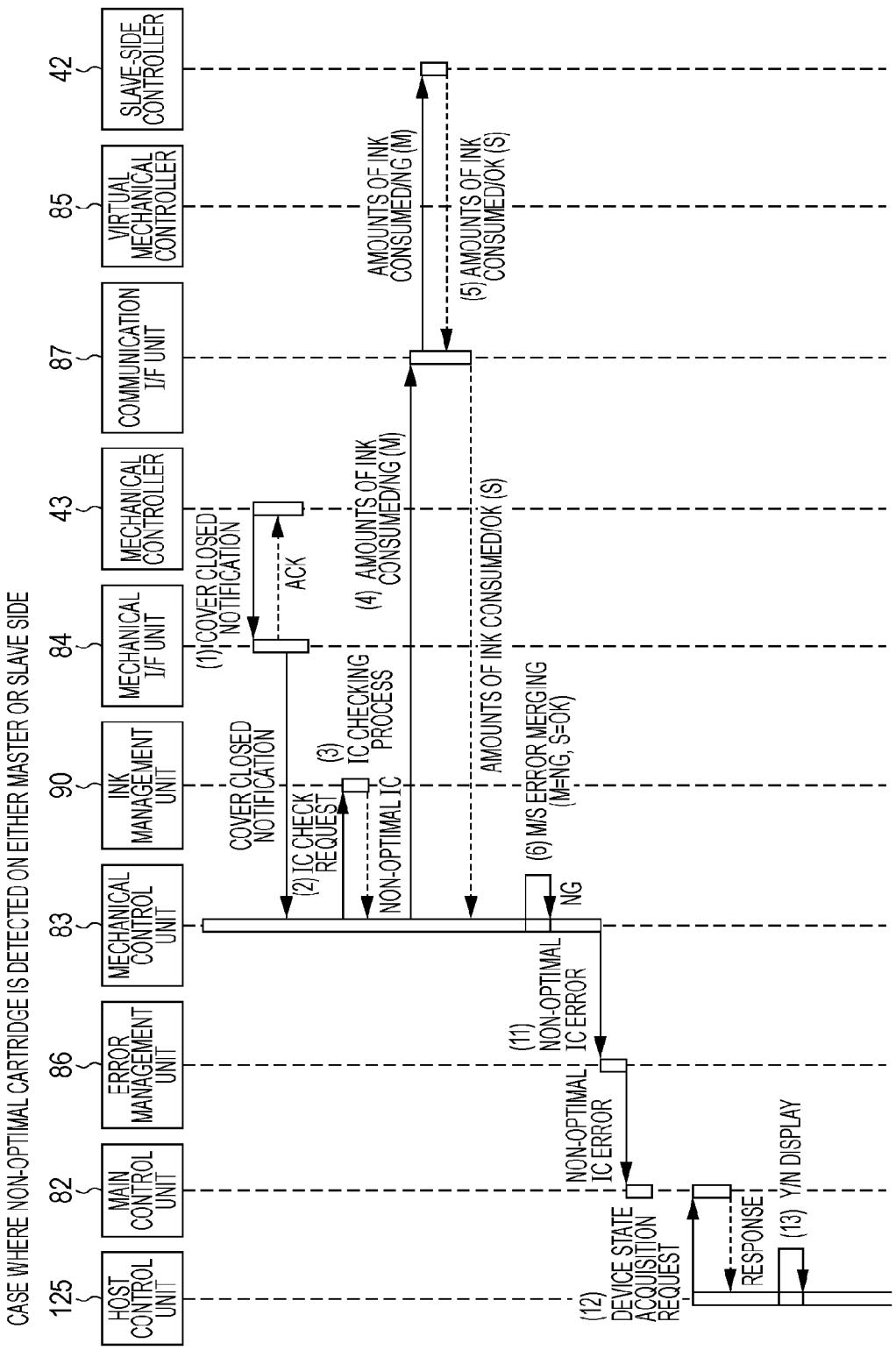
FIG. 8 is a sequence diagram illustrating processing performed in the case where there is a non-optimal ink cartridge.

Next, the processing performed in the case where a non-optimal cartridge is detected on one of the master and slave sides be described using FIG. 8. For example, it will be assumed that the user has mounted at least one non-optimal cartridge among the ink cartridges IC1 to IC4 managed on the master side.

After replacing the cartridge, the user closes the cover 38 and operates the operation switch 72, and then the mechanical controller 43 causes the cover 38 to be locked by exciting the electromagnetic lock 68 on the basis of an operation signal. Then, issuing of a cover closed notification from the mechanical controller 43 to the master-side mechanical I/F unit 84 and issuing of a cover closed notification from the mechanical I/F unit 84 to the mechanical control unit 83 ((1) in FIG. 8) are performed as in the case illustrated in FIG. 7. The mechanical control unit 83 issues an IC check request to the ink management unit 90 ((2) in FIG. 8) and the ink management unit 90 having received the IC check request, performs the IC checking process ((3) in FIG. 8). In this example, in the non-optimal cartridge detection processing within the IC checking process, the ink management unit 90 detects a non-optimal cartridge (hereafter "non-optimal IC"). The ink management unit 90 notifies the mechanical control unit 83 of the detection of a "non-optimal IC". The remaining-ink-amount calculating unit 98 of the ink management unit 90 calculates the amount of each type of ink (each color) consumed by the recording heads 29B out of the amounts of ink consumed from the time of the previous calculation of the remaining amounts of ink in the ink cartridges IC1 to IC8 on the basis of the discrete numbers of dots ejected by the seven recording heads 29B.

The mechanical control unit 83 transmits the amounts of ink consumed by the recording heads 29B, the amounts of ink remaining in the master-side ink cartridges IC1 to IC4 and an IC checking process result (detection result) of "NG" for the master-side ink cartridges IC1 to IC4 to the slave-side controller 42 via the communication I/F unit 87 ((4) in FIG. 8).

On the other hand, the amounts of ink consumed by the recording heads 29A of the master-side ink cartridges IC1 to IC4, the amounts of ink remaining in the slave-side ink cartridges IC5 to IC8 and an IC checking process result (detection result) of "OK" for the slave-side ink cartridges IC5 to IC8 are received from the slave-side controller 42 via the communication I/F unit 87 ((5) in FIG. 8). At this time, the mechanical control unit 83 instructs the ink management unit 90 to calculate the amounts of ink currently remaining (most recently) in the master-side ink cartridges IC1 to IC4 and the amounts of ink currently remaining (most recently) in the slave-side ink cartridges IC5 to IC8.

Then, the mechanical control unit 83 checks the amounts of ink remaining in the ink cartridges IC1 to IC8 and performs end of ink detection on the ink cartridges IC1 to IC8 on the basis of the respective amounts of ink remaining. Furthermore, the mechanical control unit 83 performs error merging processing in which the master-side non-optimal IC detection result and the slave-side non-optimal IC detection result are merged (combined) ((6) in FIG. 8). FIG. 8 illustrates an example of a case in which satisfactory cartridges are detected on only one of the master and slave sides and therefore the mechanical control unit 83 obtains a merged result of "NG" as a result of merge processing of a non-optimal IC detection result of "NG" from the master side and a non-optimal IC detection result of "OK" from the slave side.

Upon obtaining a merged result of "NG", the mechanical control unit 83 transmits a non-optimal IC error command (abnormal state command) to the main control unit 82 through the error management unit 86 ((11) in FIG. 8). The non-optimal IC error command is temporarily stored by the main control unit 82, and upon receiving a device state acquisition request, which is periodically transmitted from the host control unit 125, the main control unit 82 transmits device information, which was acquired from the mechanical controller as a response to the request, and the non-optimal IC error command to the host control unit 125 ((12) in FIG. 8).

Meanwhile, in the slave-side controller 42, since the merge processing result obtained by the mechanical control unit is "NG", a non-optimal IC error command is similarly transmitted to the host control unit 125 from the slave-side controller 42.

Upon receiving the non-optimal IC error command, the host control unit 125 causes the monitor 123 to display the error screen 101 illustrated in FIG. 4A. The user having looked at the error screen 101, learns that there is a non-optimal cartridge among the ink cartridges IC1 to IC8 and, in the case where the user wishes to use the non-optimal cartridge as is, the user operates the YES button 104 by using the operation unit 124. On the other hand, in the case where the user wishes to use a satisfactory cartridge, the user operates the NO button 105 by using the operation unit 124. When the NO button 105 is operated, the host control unit 125 switches the display to the error screen 106 illustrated in FIG. 4B. After replacing the non-optimal cartridge with a satisfactory ink cartridge, the user operates the OK button 109 by using the operation unit 124.

Next, the processing performed in the case where "NO" the non-optimal cartridge is not to be used is selected in the error screen 101 will be described by using FIG. 9. When an operation signal for the NO button 105 is input, the host control unit 125 sets the fact that "NO" has been selected in the parameter of an error clearance command and transmits the error clearance command to the main control units 82 of the controllers 41 and 42 ((14) in FIG. 9). The main control units 82 each further transmit the error clearance command to the mechanical control unit 83. Upon receiving the error clearance command, the mechanical control unit 83 transmits an IC NG state command to the mechanical I/F unit 84 since the value of the parameter of the error clearance command shows that "NO" has been selected ((15) in FIG. 9). The same processing is performed in the slave-side controller 42 and an IC NG state command is transmitted to the mechanical I/F unit 84.

Figure 9:
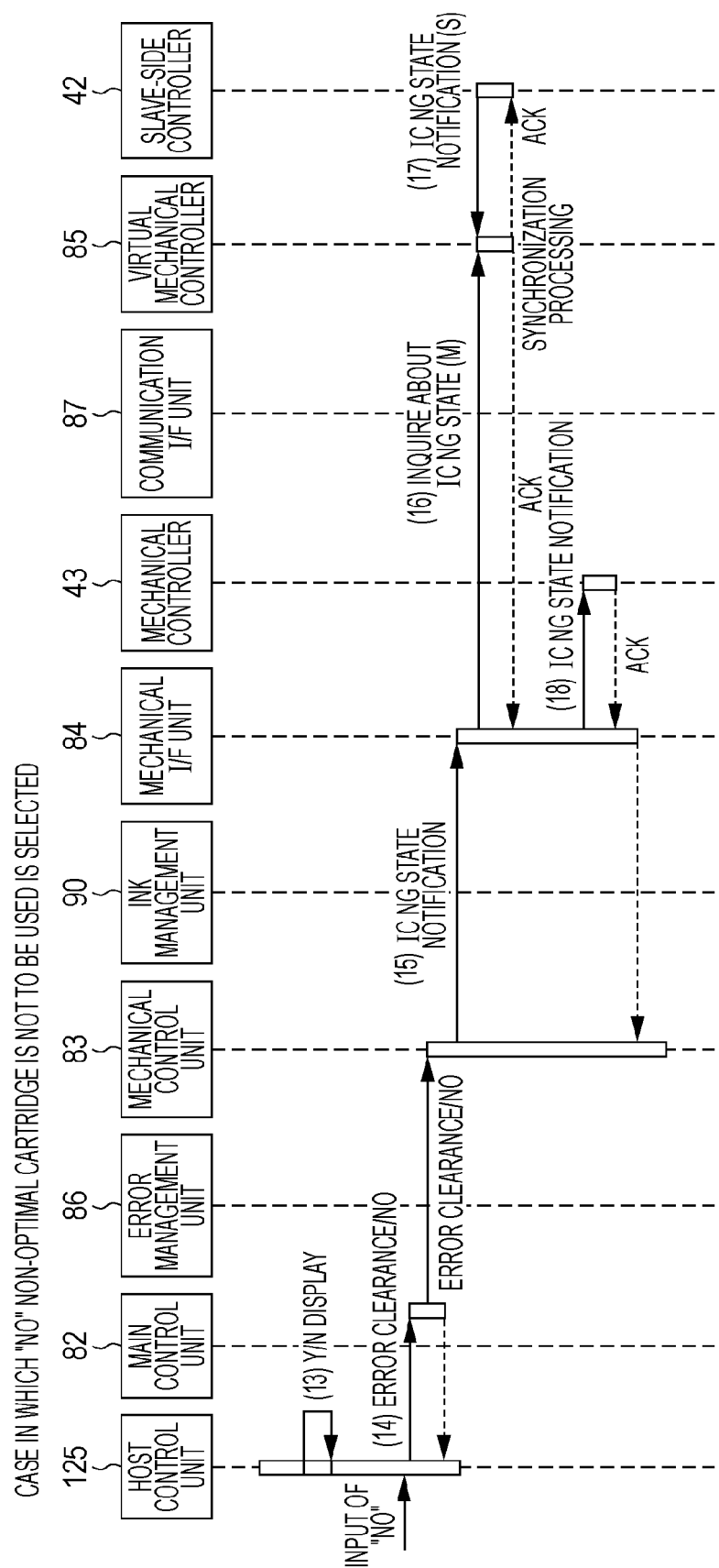
FIG. 9 is a sequence diagram for when "NO", a non-optimal cartridge is not to be used, is selected.

The mechanical I/F unit 84 queries the virtual mechanical controller 85 regarding the IC NG state command ((16) in FIG. 9). On the other hand, the slave-side controller 42 transmits an IC NG state command as a notification to the virtual mechanical controller 85 ((17) in FIG. 9). Since the IC NG state commands from both sides are present for the synchronization processing, the virtual mechanical controller 85 responds with an ACK signal to both the mechanical I/F units 84 on the master and slave sides. Upon receiving the response from the virtual mechanical controller 85, the master-side mechanical I/F unit 84 transmits the IC NG state command to the mechanical controller 43.

Upon receiving the IC NG state command notification, if the ink supply device 39 is already stopped at this time, the mechanical controller 43 maintains the ink supply device 39 as is in the stopped state, whereas in the case where the ink supply device 39 is in an state where supply of ink can be initiated, the mechanical controller 43 causes the ink supply device 39 to transition to state in which the supply of ink is stopped.

Next, the processing performed in the case where "YES" the non-optimal cartridge is to be used is selected in the error screen 101 will be described by using FIG. 10. When an operation signal for the YES button 104 is input, the host control unit 125 sets the fact that "YES" has been selected in the parameter of an error clearance command and transmits the error clearance command to the main control units 82 of the controllers 41 and 42 ((19) in FIG. 10). The main control units 82 each further transmit the error clearance command to the mechanical control unit 83. Upon receiving the error clearance command, the mechanical control unit 83 checks the value of the parameter of the error clearance command that indicates that "YES" has been selected.

Figure 10:
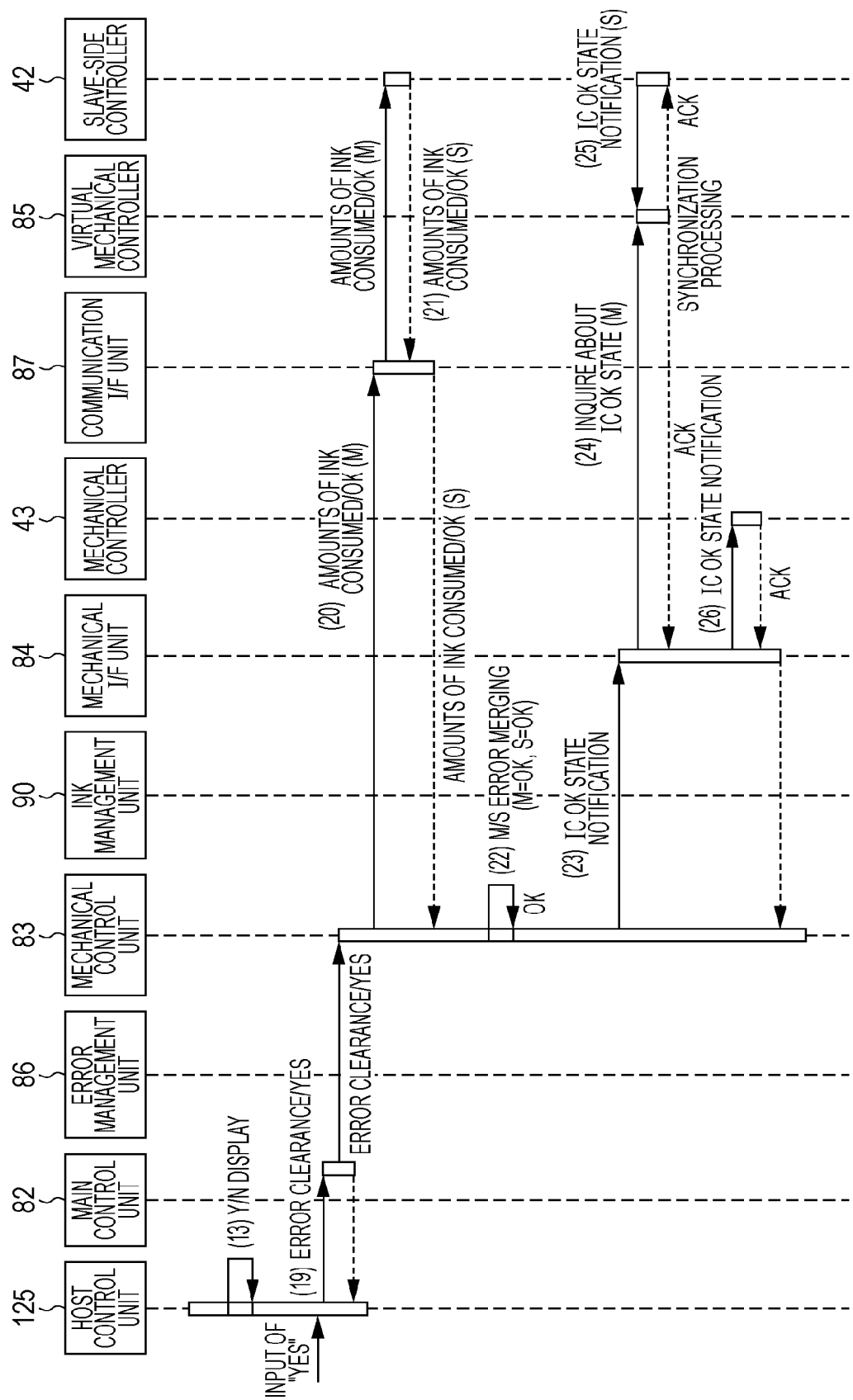
FIG. 10 is a sequence diagram for when "YES", a non-optimal cartridge is to be used as is, is selected.

The mechanical control unit 83 transmits the amounts of ink consumed by the recording heads 29B, the amounts of ink remaining in the master-side ink cartridges IC1 to IC4 and an IC checking process result (detection result) of "OK" for the master-side ink cartridges IC1 to IC4 to the slave-side controller 42 via the communication I/F unit 87 ((20) in FIG. 10).

On the other hand, the master-side mechanical control unit 83 receives via the communication I/F unit 87 amounts of ink consumed by the recording heads 29A, the amounts of ink remaining in the slave-side ink cartridges IC5 to IC8 and an IC checking process result (detection result) of "OK" for the slave-side ink cartridges IC5 to IC8 transmitted from the slave-side controller 42 to the master-side communication I/F unit 87 ((21) in FIG. 10). At this time, the mechanical control unit 83 instructs the ink management unit 90 to calculate the amounts of ink currently remaining (most recently) in the ink cartridges IC1 to IC8. If printing is currently stopped, the amounts of ink remaining will not have changed from those calculated the previous time and even in the case where a printing operation is in progress the amounts of ink consumed will only be a little from the remaining amounts of ink calculated the previous time and therefore the values will not have substantially changed. Therefore, if end of ink was not detected the previous time, end of ink will also be not detected this time.

Next, the mechanical control unit 83 performs error merging processing in which the master-side non-optimal IC detection result of "OK" and the slave-side non-optimal IC detection result "OK" are merged ((22) in FIG. 10). In this example in which "YES", the non-optimal cartridge is to be used as is, has been selected, the non-optimal cartridge is regarded as being satisfactory and therefore the mechanical control unit 83 obtains "OK" as a merged result.

When the mechanical control unit 83 obtains a merged result of "OK", the mechanical control unit 83 transmits an IC OK state command to the mechanical I/F unit 84 ((23) in FIG. 10). The mechanical I/F unit 84 queries the virtual mechanical controller 85 regarding the received IC OK state command ((24) in FIG. 10). The same processing is performed in the slave-side controller 42 and the virtual mechanical controller 85 receives the IC OK state command as a notification from the slave-side controller 42 ((25) in FIG. 10). Upon checking that the IC OK state commands from both sides are present for the synchronization processing, the virtual mechanical controller 85 responds with an ACK signal to both the mechanical I/F units 84 on the master and slave sides. Upon receiving the response from the virtual mechanical controller 85, the master-side mechanical I/F unit 84 transmits the IC OK state command to the mechanical controller 43 ((26) in FIG. 10).

Upon receiving the IC OK state command notification, the mechanical controller 43 drives the ink supply device 39 by driving the pump motor 65. As a result, pressurized air is supplied to the individual ink cartridges IC1 to IC8 and ink supplied from the ink cartridges IC1 to IC8 is supplied to the recording heads 29 through the respective sub-tanks 67. In this way, in the case where the user permits a non-optimal cartridge to be used as is (case where "YES" is selected), since the ink cartridges IC1 to IC8 are all detected as being satisfactory cartridges, supplying of ink is performed by initiating the ink supply device 39. In cases where supply of ink by the ink supply device 39 is already in progress, such as when the cover 38 has been opened and closed during a printing operation, the supply of ink is continued.

As has been described in detail above, in this embodiment, the following advantages can be obtained.

(1) A configuration is adopted in which detection results for the allocated ink cartridges IC are transmitted between the controllers 41 and 42 through the communication line SL4 and the detection results obtained on the side of one controller and the detection results obtained on the side of the other controller are merged. Even in the case where the detection result in one controller is abnormal and the detection result in the other controller is normal, the merged results obtained by both the controllers 41 and 42 through the merge processing come to match. As a result, the commands corresponding to the merged results received from the mechanical I/F units 84 of the controllers 41 and 42 match in the synchronization processing of the virtual mechanical controller 85 and therefore the commands can be output to the mechanical controller 43 in synchronization between the controllers 41 and 42.

(2) Furthermore, supposing a configuration were adopted in which an OK state command and an NG state command based on different detection results are output without merging the detection results in both the controllers 41 and 42, the commands would not match in the virtual mechanical controller 85 and no matter how many times a retry operation would be performed the commands would still not match and therefore a command transmission error would occur. In contrast, according to this embodiment, state notification commands come to be the same due to the merging processing of detection results being performed in the controllers 41 and 42 on the master and slave sides and therefore the occurrence of this kind of command transmission error can be avoided. Consequently, resetting of the controllers 41 and 42, which must be performed when a command transmission error occurs, can be avoided as much as possible.

(3) State notification commands corresponding to the detection results of the controllers 41 and 42 are merged and therefore a situation in which an OK state command is transmitted from one controller and an NG state command is transmitted from another controller can be avoided. Consequently, a situation in which the mechanical controller 43 initiates the ink supply device 39, when it should not be initiated, or inappropriately stops the ink supply device 39 while it is operating can be avoided.

(4) In the case where the result of the merge processing is NG, the host control unit 125 is informed of this fact and Y/N is displayed on the monitor 123. Then, once YES or NO has been selected, when the user has cleared the cause of the error and selected OK, the error is cleared and an OK state notification is issued. Accordingly, an appropriate OK state notification (OK state command) can be transmitted to the mechanical controller 43. Furthermore, in the case where the result of the merge processing of the controllers 41 and 42 is OK, an appropriate OK notification (OK state command) can be transmitted to the mechanical controller 43. Therefore, inappropriate starting and inappropriate stopping of operation units such as the ink supply device 39 or the like due to an inappropriate state notification being issued can be avoided.

(5) Although the plurality of controllers 41 and 42 have the same functional configuration as illustrated in FIG. 6, the functions thereof relating to the synchronization processing are different on the master and slave sides but can be realized by the same program.

(6) The ink management unit 90 (detection unit) detects errors such as an out of ink error on the basis of ink-related information acquired from the memory elements 47 of ink cartridges IC. Then, when an error command generated on the basis of a detection result such as an out of ink error is transmitted to the other controller through the communication I/F units 87 and 87, a checking result of the IC checking process (detection result) is also transmitted together therewith. Accordingly, compared to transmitting them separately, necessary information can be more speedily passed to the other controller. As a result, calculation of the remaining amounts of ink and the merge processing are performed more quickly and processing delays can be avoided as much as possible.

The above-described embodiment can be modified in the following ways.

A configuration can be adopted in which the ink management unit 90, which is an example of a detection unit, does not perform detection of a non-optimal cartridge or a configuration can be adopted in which a checking unit, which checks whether a non-optimal cartridge is to be used as is, is not provided. For example, when an abnormality such as exhaustion of ink, failure of mounting of a cartridge, or mounting of a cartridge of the wrong color is detected by one controller, the merged results of the controllers 41 and 42 both become abnormal and therefore abnormal state commands from both controllers come to be present in the virtual mechanical controller 85 and therefore the occurrence of command transmission errors can be avoided. Moreover, the other controller also for example performs merging when a normal state is detected, whereby transmission of a normal state command can be avoided and therefore inappropriately starting or stopping an operation unit (for example, the ink supply device 39), due to an inappropriate command being transmitted to the mechanical controller 43, can be avoided as much as possible.

A configuration may be adopted in which non-optimal cartridge detection processing is performed but non-usable cartridge detection processing is not performed. Furthermore, in the case where a non-optimal cartridge is detected, a checking unit that checks the user's intention by prompting the user to select OK or NO as to whether to continue using the non-optimal cartridge as is, may be omitted.

A configuration may be adopted in which the detection results of a detection unit and the consumed amounts of fluid are separately transmitted to another print control device. Furthermore, calculated values based on the transmitted and received amounts of consumed fluid are not limited to the amounts of fluid remaining in fluid accommodating vessels and may instead be the amounts of consumed fluid. Furthermore, it is not necessary for the amounts of fluid remaining or consumed in the fluid accommodating vessels to be calculated to such a degree that exhaustion of fluid (exhaustion of ink as an example) can be detected on the basis of the results.

The checking unit is not limited to the host control unit 125 of the host apparatus 120. For example, a checking unit that is connected to the monitor on the mechanical controller 43 side and prompts selection of whether to use a non-optimal component as is may be provided in the mechanical controller 43.

The synchronization unit is not limited to using a method performed by the virtual mechanical controller 85. For example, a configuration may be adopted in which a synchronization circuit is provided between the plurality of print control devices and the mechanical controller 43 as a common output destination of the individual print control devices and once commands from all the plurality of print control devices are present in the synchronization circuit, the commands are transmitted to the mechanical controller 43.

The synchronization unit is not limited to receiving commands from each of the output units of the plurality of print control devices and a configuration may be adopted in which information that can be used in the determination of whether commands match is received rather than commands. As an example of such information, identifier information (for example command number) or the like of a command can be given. In short, any configuration that can check whether a command to be output is present in all of a plurality of print control devices is sufficient.

Commands based on detection results of a detection unit may be internal commands individually generated inside the print control devices (for example, controllers). In this case, an internal command is not limited to an internal command and may be a command expressing normality (normality notification command) or may be command for making a notification regarding detection results or states corresponding to the above-described three types. Since the merged results created by merging the detection results by using the combining unit (merge processing unit 83A) are the same in both the print control devices, commands based on the combined results will also be the same in both the print control devices. Therefore, a command transmission error generated due to not all the commands being present in the synchronization processing and a command transmission error generated due to command processing paths being different for different detection results and only one command arriving in the synchronization processing, can be avoided.

The detection unit is not limited to the ink management unit 90 that detects the state (for example, failure of mounting, exhaustion of ink, non-optimal cartridge) of an ink cartridge, as an example of a component. A nozzle testing unit for testing for clogging of the nozzles of each of the recording heads 29 is provided and a plurality of such nozzle testing units are allocated to and connected to the plurality of controllers 41 and 42 as examples of components. Then, a configuration can also be adopted in which each of the controllers is equipped with a test control unit (detection unit) that has a function of controlling the nozzle testing units and a detection function of detecting clogging of nozzles (nozzle error) on the basis of nozzle testing results of the nozzle testing units. In this case, the other controller is notified of a nozzle test result or a command based on this test result via the communication I/F units 87 and 87 by communication between the controllers 41 and 42. Then, each of the mechanical control units 83 within the controllers 41 and 42 generates a nozzle clogging error command (nozzle error command) on the basis of merged results obtained by the merge processing unit merging the nozzle test results of the test control units and generates a cleaning command that causes the maintenance device 32 to perform cleaning. Therefore, even in a case where different detection results are obtained by the controllers 41 and 42 on the master and slave sides, the merged results come to be the same and therefore nozzle error commands and cleaning commands based on the merged results can be output to the mechanical controller 43 without causing generation of command transmission errors or inappropriate starting or stopping of operation units. In the case where detection results showing nozzle clogging are obtained, the host control unit 125 (checking unit) may be configured to display a screen prompting the user to select whether or not a cleaning operation should be performed.

Printing units allocated to and controlled by the controllers 41 and 42, as examples of print control devices, are not limited to the recording heads 29. The printing units may be for example carriage driving systems that include carriage motors or may be transport driving systems that include transport motors. Furthermore, the printing unit can be formed by adding a carriage driving system or a transport driving system to a recording head 29. Furthermore, the printing unit can also be formed of a carriage driving system or a transport driving system.

Not limited to two print control devices, a configuration can be adopted in which three or more print control devices are connected to one another.

There may be just one recording head. For example, a configuration can also be adopted in which two or more print control devices are allocated with and control a plurality of head regions (divided nozzle groups) obtained by dividing all the nozzles in a line-type elongated recording head into a plurality of groups and the print control devices output commands to the mechanical controller in synchronization with each other.

The functional units of the controllers illustrated in FIG. 6 may be realized mainly by software by having the CPU execute programs, may be realized by hardware or may be realized through cooperation of software and hardware.

The printing apparatus is not limited to the lateral-type printer 11 and may be a serial printer, a line printer or a page printer. Furthermore, not limited to ink jet printing apparatuses, the invention can also be applied to dot impact printing apparatuses.

In the above-described embodiment, the ink jet printer 11 is adopted as a printing apparatus, but instead a fluid ejecting apparatus that ejects or discharges a fluid other than ink may be adopted. Furthermore, the invention can be applied to a variety of liquid ejecting apparatuses equipped with for example liquid ejecting heads that discharge minute liquid droplets. In this case, the term "liquid droplet" refers to the state of a liquid being discharged from the liquid ejecting apparatus and also includes the meaning one whose tail is drawn out into a grain-like shape, a tear-like shape or a thread shape. Furthermore, here, the term "liquid" may refer to any material that can be ejected by a liquid ejecting apparatus. For example, such a substance may be any substance so long as the substance is in a liquid phase and such substances may include fluids such as high- and low-viscosity liquids, sols, gel water, other inorganic solvents, organic solvents, solutions, liquid resins, liquid metals (metal melts) and substances formed of not just a liquid such as those obtained by dissolving particles of a functional material composed of a solid substance such as a pigment or metal particles into a solvent, or dispersing or mixing such particles in a liquid. In addition, representative examples of liquids include inks, as described in the above embodiment, and liquid crystal. Here, the term "ink" includes various liquid phase substances such as general water-based inks and oil-based inks, and gel inks and hot melt inks. Specific examples of liquid ejecting apparatuses include liquid ejecting apparatuses that eject liquids that include a material, such as an electrode material or a colorant, in the body of a dispersion or solution used in the manufacture of for example liquid crystal displays, electroluminescent (EL) displays, planar light emitting displays, and color filters. Furthermore, the liquid ejecting apparatus may be a liquid ejecting apparatus that ejects a living organic material used in the manufacture of bio-chips, a liquid ejecting apparatus that is used as a precision pipette and ejects a liquid to be used as a sample, a textile printing apparatus or a micro-dispenser. Furthermore, a liquid ejecting apparatus that ejects a lubricating oil with pinpoint precision onto precision mechanisms such as those of watches and cameras, a liquid ejecting apparatus that ejects a transparent resin liquid such as an ultraviolet curable resin onto a substrate in order to form minute hemispherical lenses (optical lenses) used in optical communication devices and the like, or a liquid ejecting device that ejects an etching liquid such as an acid or an alkali in order to etch a substrate or the like, may be adopted. The invention can be applied to any of these types of liquid ejecting apparatuses. In addition, the fluid may be a powder such as toner. The term "fluid" used in this specification does not refer to substances composed solely of gas.

What is claimed is:

1. A printing apparatus comprising:
   a first print control device and a second print control device, which are allocated with and control printing units;
   a driving control unit that controls driving of mechanical printing mechanisms on the basis of commands from the first print control device and the second print control device;
   first components being allocated to and connected to the first print control devices; and
   second components being allocated to and connected to the second print control devices,
   wherein the first print control device includes:
      a first detecting unit that detects states of the first components;
      a first communication unit for transmitting a first detection result of the first detection unit to the second print control device connected to the first print control device and receiving a second detection result from the second print control device;
      a first combining unit that combines the first detection result and the second detection result received from the second print control device;
      a first command generating unit that generates a normal state command if the combined result created by the first combining unit is normal and that generates an abnormal state command if the combined result created by the first combining unit is abnormal;
      a first synchronizing unit; and
      a first output unit that queries to the first synchronizing unit when upon receiving the normal state command or the abnormal state command from the first command generating unit and if receiving a first acknowledgment signal from the first synchronizing unit as a response to the query, the first output unit transmits the normal state command or the abnormal state command to the driving control unit, wherein the second print control device includes:

a second detecting unit that detects states of the second components;

a second communication unit for transmitting the second detection result of the second detection unit to the first print control device connected to the first print control device and receiving the first detection result from the first print control device;

a second combining unit that combines the first detection result and the second detection result;

a second command generating unit that generates a normal state command if the combined result created by the second combining unit is normal and that generates an abnormal state command if the combined result created by the second combining unit is abnormal;

a second synchronizing unit; and a second output unit that queries to the second synchronizing unit when upon receiving the normal state command or the abnormal state command from the second command generating unit and if receiving a second acknowledgment signal from the second synchronizing unit as a response to the query, the second output unit transmits the normal state command or the abnormal state command to the first synchronizing unit, wherein the first synchronizing unit that, upon receiving the query from the first output unit, the first synchronizing unit responds with the first acknowledgment signal to the first output unit under the condition that the normal state command or the abnormal state command from the first command generating unit and the normal state command or the abnormal state command from the second command generating unit are present in the first synchronizing unit and that the present commands match, and wherein the second synchronizing unit that, upon receiving the query from the second output unit, the second synchronizing unit responds with the second acknowledgment signal to the second output unit unconditionally.

2. The print control device according to claim 1, wherein the first detection unit detects a non-optimal component state of a non-optimal component that the printing apparatus can use to perform printing even though it is not recommended and in the case where a non-optimal component state is detected, the first detection unit obtains an abnormal detection result and in the case where a satisfactory component state is detected, the first detection unit obtains a normal detection result, and wherein, in the case where the first detection result is abnormal, the command generating unit transmits an abnormal state command to a checking unit as a notification, the checking unit prompting selection of whether to use the non-optimal component as is, and upon receiving a response from the checking unit that the non-optimal component is to be used as is, generates a normal state command.

3. The print control device according to claim 2, wherein the first and second components are fluid accommodating bodies that accommodate a fluid to be supplied to the printing units and a memory unit is provided in each fluid accommodating body, the memory unit storing reference information that is referred to when detection is performed by the first and second detection units, and wherein the first and second detection units detect an abnormality in the respective fluid accommodating bodies on the basis of the reference information read out from the memory elements.

4. The print control device according to claim 1, wherein the first and second components are fluid accommodating bodies that accommodate a fluid to be supplied to the printing units and a memory unit is provided in each fluid accommodating body, the memory unit storing reference information that is referred to when detection is performed by the first and second detection units, and wherein the first and second detection units detect an abnormality in the respective fluid accommodating bodies on the basis of the reference information read out from the memory elements.

5. The print control device according to claim 1, wherein if the first and second detection results prior to being combined include even one detection result of a detection of a non-optimal component, the first combining unit makes the result of combining be an abnormal result, whereas if all satisfactory components are detected, the first combining unit makes the result of combining the individual detection results be a normal result.

6. The print control device according to claim 5, wherein a plurality of print heads included in the printing units are allocated to and connected to the first and second print control devices, the print control devices each further comprising a consumed amount acquiring unit that acquires an amount of fluid consumed by the print heads allocated to the respective print control device of the first and second print control devices, wherein an amount of fluid consumed by the print heads connected to the second print control device from each allocated fluid accommodating body is received from the second print control device through the communication unit and an amount of fluid consumed by the print heads connected to the first print control device from each allocated fluid accommodating body is transmitted to the second print control device via the communication unit, wherein the consumed amount acquiring unit calculates a remaining amount or consumed amount of fluid in each fluid accommodating body allocated to the first print control device on the basis of the acquired amount of fluid consumed and the consumed amount of fluid received from the second print control device, and wherein the non-optimal state detection result obtained by the first detection unit and the amount of fluid consumed are transmitted and received together between the first print device and the second print control device.

7. A print control method for a printing apparatus equipped with a first and second print control device, each of which are allocated with and control printing units, and a driving control unit that controls driving of mechanical printing mechanisms on the basis of commands from the first and second print control devices, first components allocated to the first print control device, and second components allocated to the second print control device, the print control method comprising:

detecting the states of the first allocated components using a first detecting unit of the first print control device;

transmitting a first detection result of the first detection unit to the second print control device connected to the first print control device and receiving a second detection result from the second print control device using a first communication unit of the first communication unit of the first print control device;

combining the first detection result and the second detection result received from the second print control device in a first combining unit of the first print control device using a first combining unit of the first print control device;

generating a normal state command if the combined result created by the first combining unit is normal and generating an abnormal state command if the combined result created by the first combining unit is abnormal using a first command generating unit of the first print control device;

querying a first synchronizing unit of the first print control device using a first synchronizing unit of the first print control device when upon receiving the normal state command or the abnormal state command from the first command generating unit, and, if receiving a first acknowledgment signal from the first synchronizing unit as a response to the query, transmitting the normal state command or the abnormal state command to the driving control unit, detecting the states of the second allocated components using a second detecting unit of the second print control device;

transmitting the second detection result of the second detection unit to the first print control device connected to the first print control device and receiving the first detection result from the first print control device using a second communication unit of the second print control device;

combining the first detection result and the second detection result using a second combining unit of the second print control device;

generating a normal state command if the combined result created by the second combining unit is normal and that generates an abnormal state command if the combined result created by the second combining unit is abnormal using a second command generating unit; and querying a second synchronizing unit of the second print control device using a second output unit, when upon receiving the normal state command or the abnormal state command from the second command generating unit and if receiving a second acknowledgment signal from the second synchronizing unit as a response to the query, the second output unit transmits the normal state command or the abnormal state command to the first synchronizing unit, wherein upon receiving the query from the first output unit, the first synchronizing unit responds with the first acknowledgment signal to the first output unit under the condition that the normal state command or the abnormal state command from the first command generating unit and the normal state command or the abnormal state command from the second command generating unit are present in the first synchronizing unit and that the present commands match, wherein upon receiving the query from the second output unit, the second synchronizing unit responds with the second acknowledgment signal to the second output unit unconditionally.

* * * * *